(12) United States Patent
Kim et al.

(10) Patent No.: US 8,013,517 B2
(45) Date of Patent: Sep. 6, 2011

(54) PHOSPHOR MATERIAL, COATING PHOSPHOR COMPOSITION, AND LIGHT EMITTING DEVICE

(75) Inventors: Choong Youl Kim, Gwangju (KR); Sung Min Kong, Gwangju (KR); Hee Seok Choi, Gwangju (KR); Seung Hyok Park, Daejeon (KR); Ho Shin Yoon, Gwangju (KR); Chang Hee Lee, Daejeon (KR)

(73) Assignees: LG Innotek Co., Ltd., Seoul (KR); Force4 Corp., Gwangju (KR)

( * ) Notice: Subject to any disclaimer, the term of this patent is extended or adjusted under 35 U.S.C. 154(b) by 341 days.

(21) Appl. No.: 12/299,438

(22) PCT Filed: Dec. 27, 2007

(86) PCT No.: PCT/KR2007/006911
§ 371 (c)(1),
(2), (4) Date: Nov. 3, 2008

(87) PCT Pub. No.: WO2008/082163
PCT Pub. Date: Jul. 10, 2008

(65) Prior Publication Data
US 2009/0206729 A1     Aug. 20, 2009

(30) Foreign Application Priority Data

Dec. 29, 2006 (KR) .......... 10-2006-0137807
Dec. 18, 2007 (KR) .......... 10-2007-0133051

(51) Int. Cl.
*H01J 1/62* (2006.01)

(52) U.S. Cl. ............ 313/503; 252/301.4 R
(58) Field of Classification Search ......... 252/301.4 R; 313/483–487, 498–512
See application file for complete search history.

(56) References Cited

U.S. PATENT DOCUMENTS

| 6,899,825 B2 * | 5/2005 | Matsuda et al. ...... 252/301.4 F |
| 2003/0085853 A1 | 5/2003 | Shiiki et al. |
| 2004/0027047 A1 | 2/2004 | Matsuda et al. |
| 2007/0029524 A1 | 2/2007 | Isobe et al. |

FOREIGN PATENT DOCUMENTS

| EP | 1632545 A1 | 3/2006 |
| JP | 2003-313549 A | 11/2003 |
| JP | 2005-126704 A | 5/2005 |
| JP | 2006-228437 A | 8/2006 |
| KR | 10-2006-0111115 A | 10/2006 |
| WO | WO-2004-085570 A1 | 10/2004 |
| WO | WO 2008/047965 A1 | 4/2008 |

OTHER PUBLICATIONS

Lee et al., "White-light-emitting phosphor: CaMgSi2O6.Eu2+, Mn2+ and its related properties with blanding," Applied Physics Letters, vol. 89, No. 22, Nov. 30, 2006, pp. 221916-1-221916-3.

* cited by examiner

*Primary Examiner* — Anne M Hines
(74) *Attorney, Agent, or Firm* — Birch, Stewart, Kolasch & Birch, LLP

(57) ABSTRACT

Disclosed are a phosphor, a coating phosphor composition, a method for preparing the phosphor, and a light emitting device. A silicate-based phosphor is expressed in a chemical formula of $(4-x-y-z)SrO \cdot xBaO \cdot zCaO \cdot aMgO \cdot 2(SiO_2) \cdot bM_2O_3:yEu$, wherein M is at least one of Y, Ce, La, Nd, Gd, Tb, Yb or Lu, in which $0<x\leq3.95$, $0<y\leq1$, $0\leq z<3.95$, $x+y+z<4$, $0<a<2$, and $0<b<1$.

32 Claims, 12 Drawing Sheets

[Figure 1]
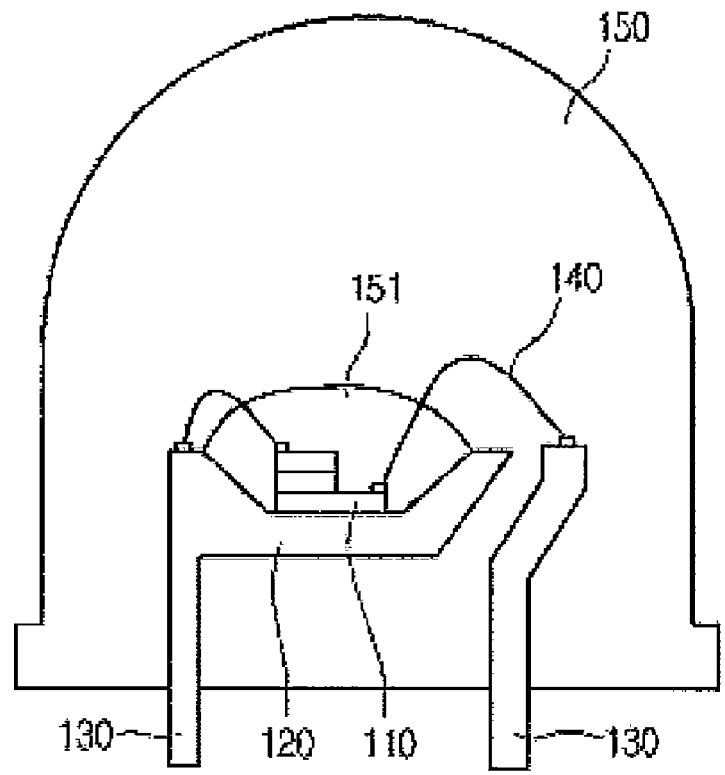
[Figure 2]
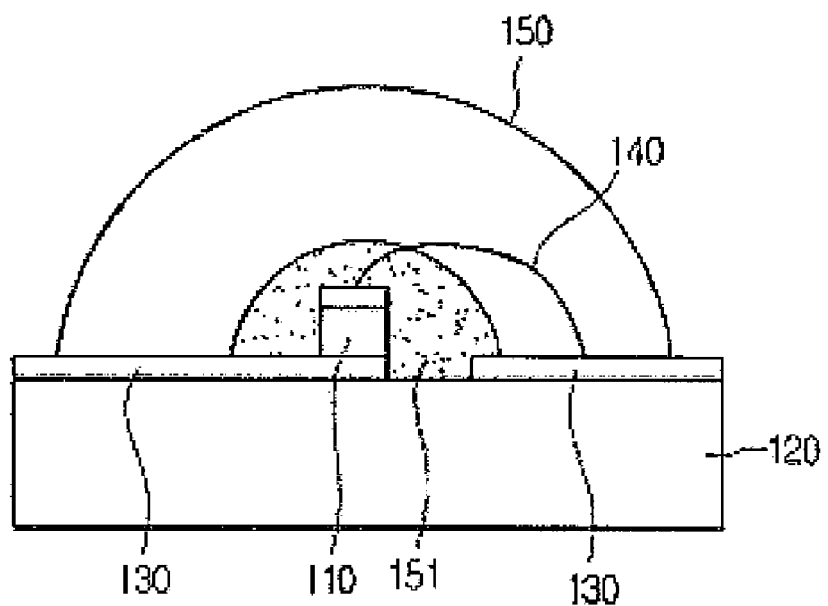

[Figure 3]
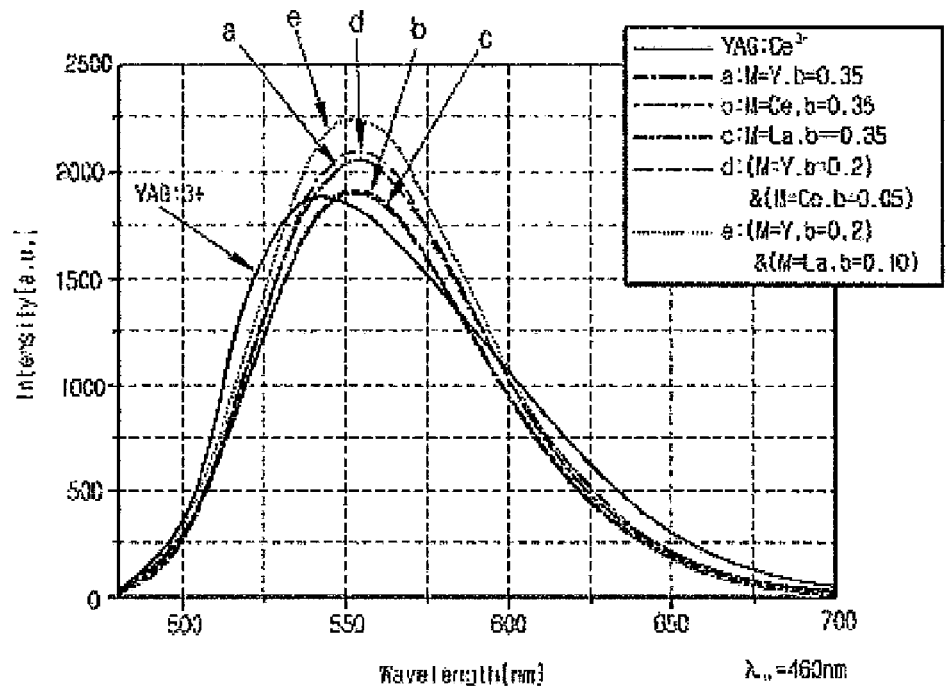
[Figure 4]
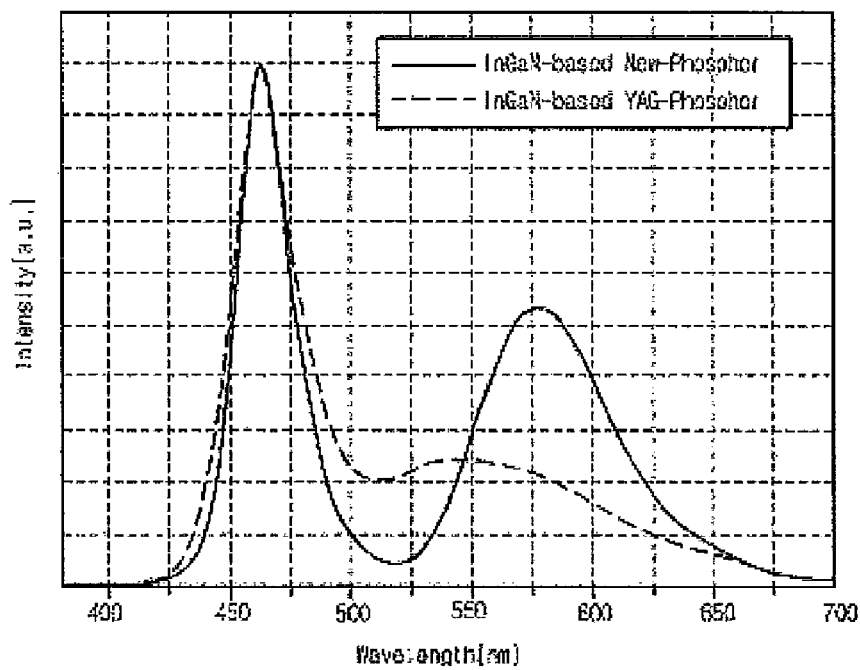

[Figure 5]
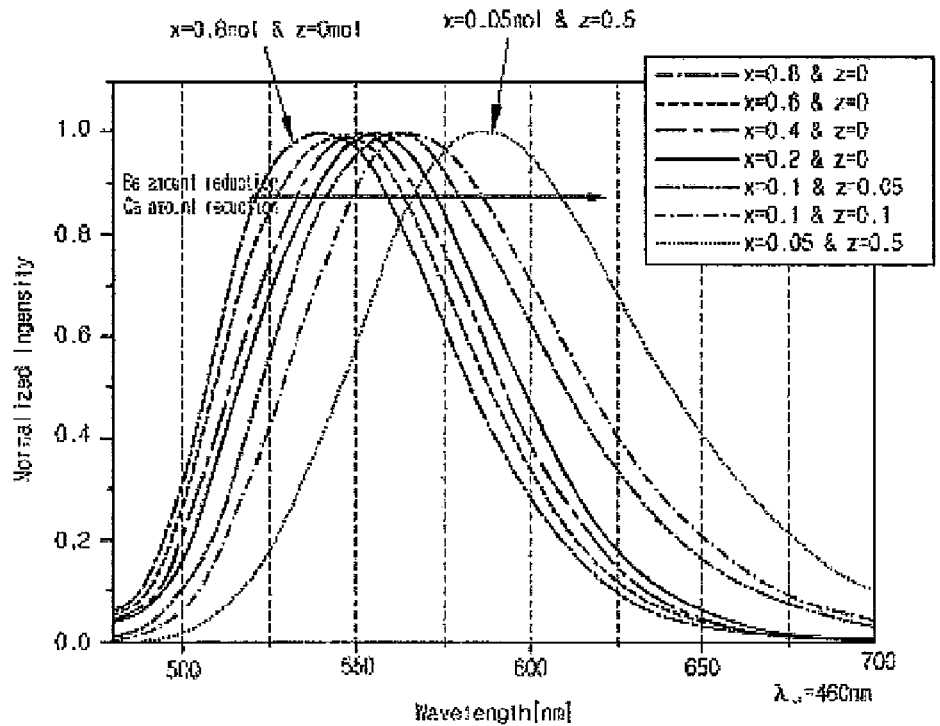
[Figure 6]
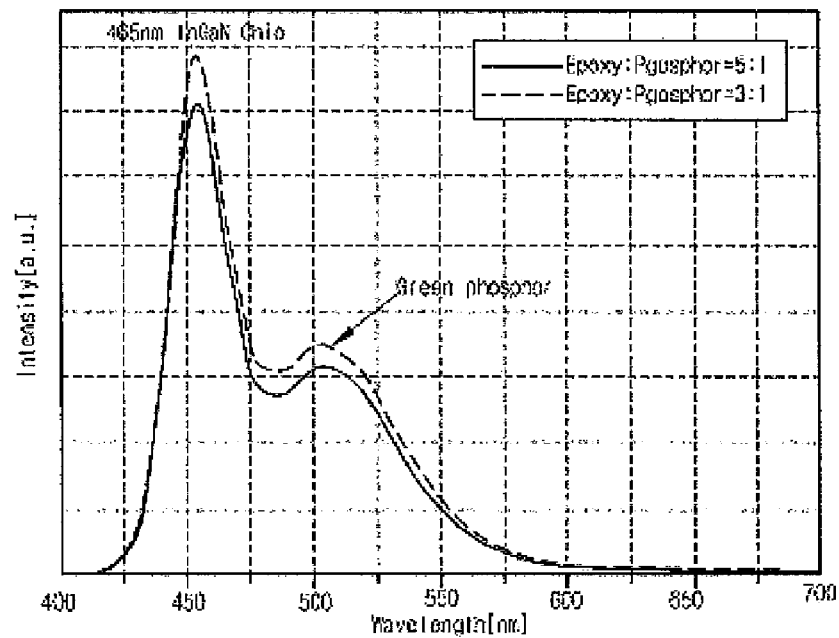

[Figure 7]
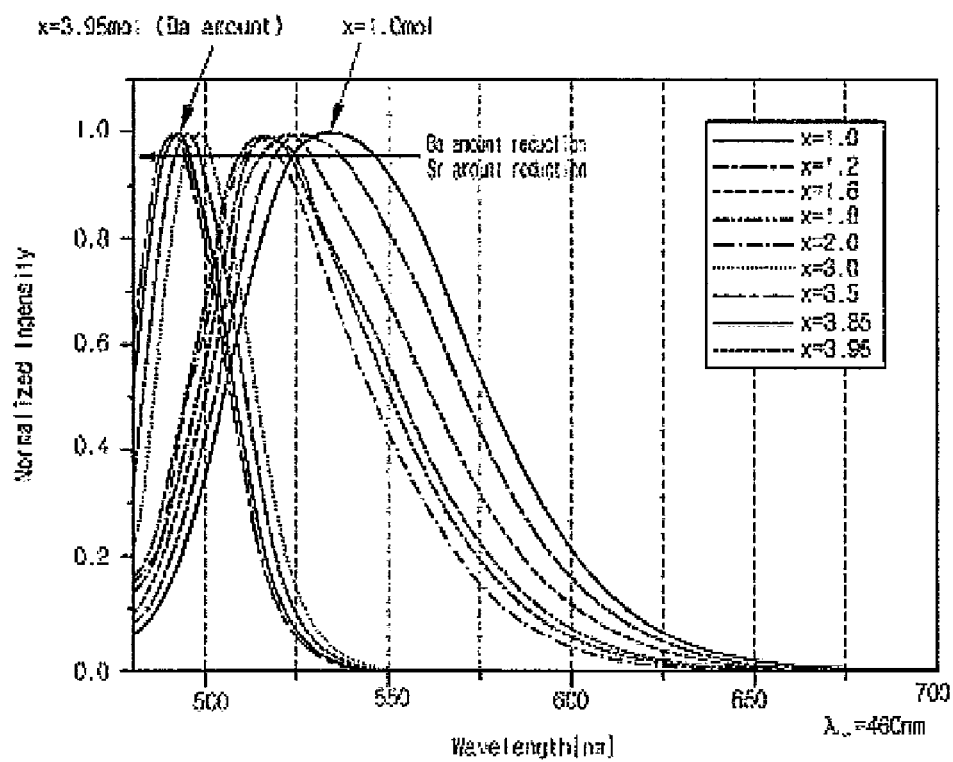
[Figure 8]
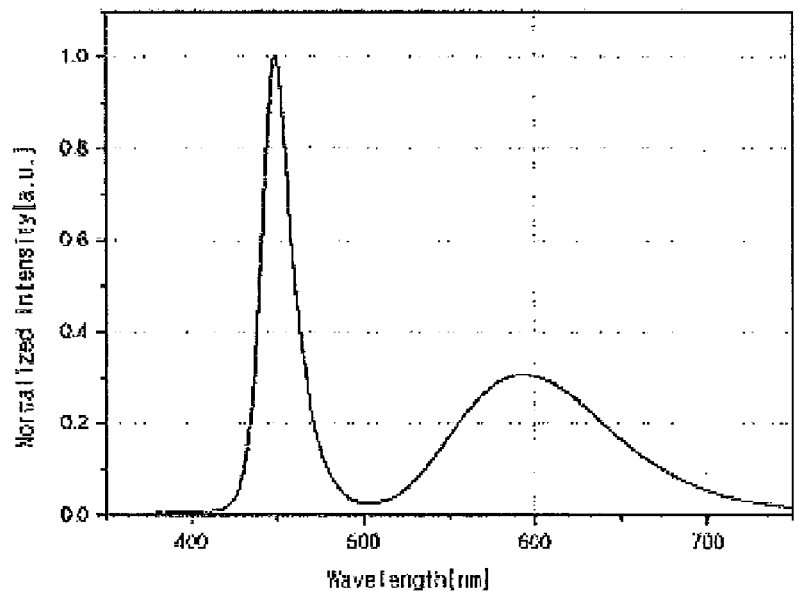

[Figure 9]
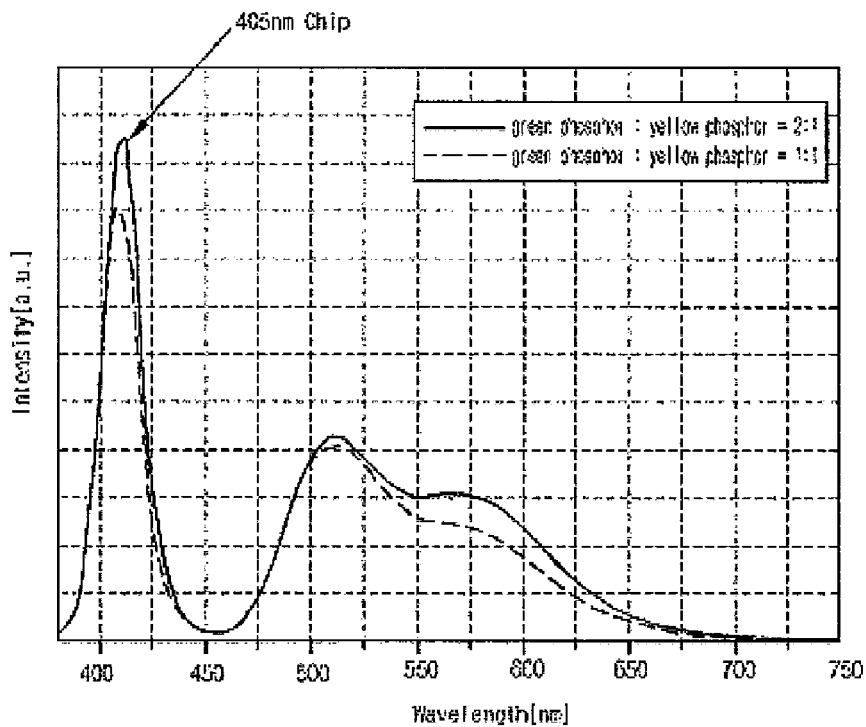
[Figure 10]
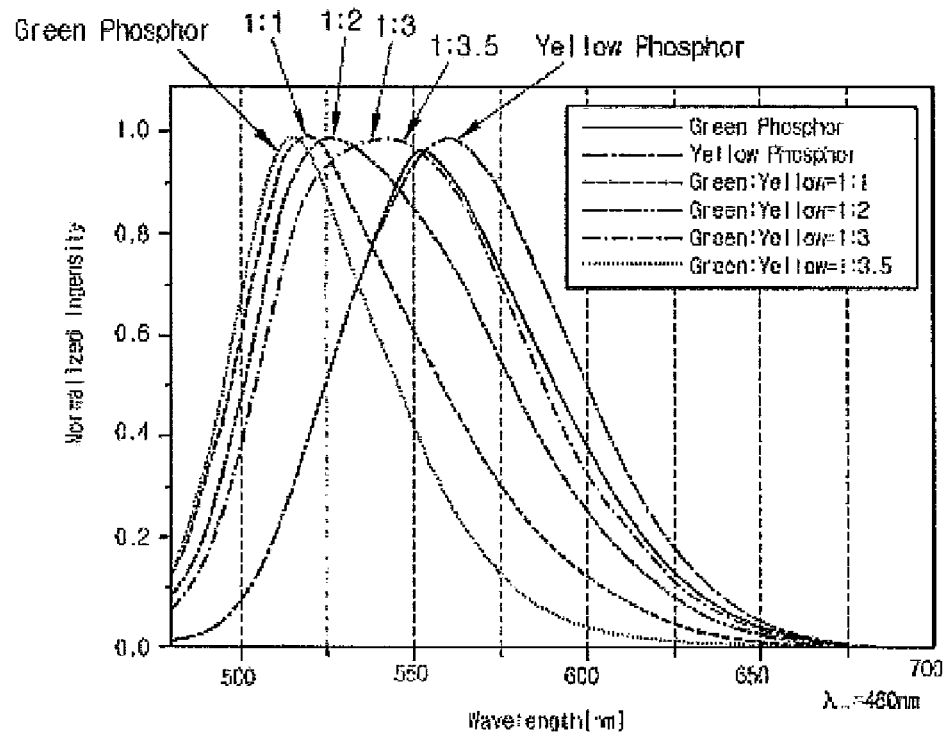

[Figure 11]
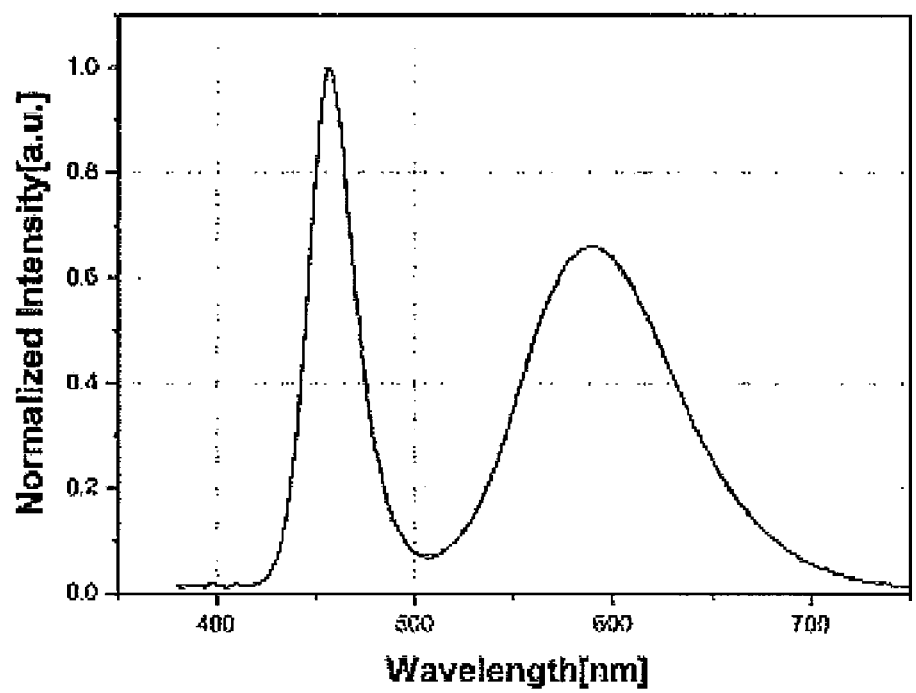
[Figure 12]
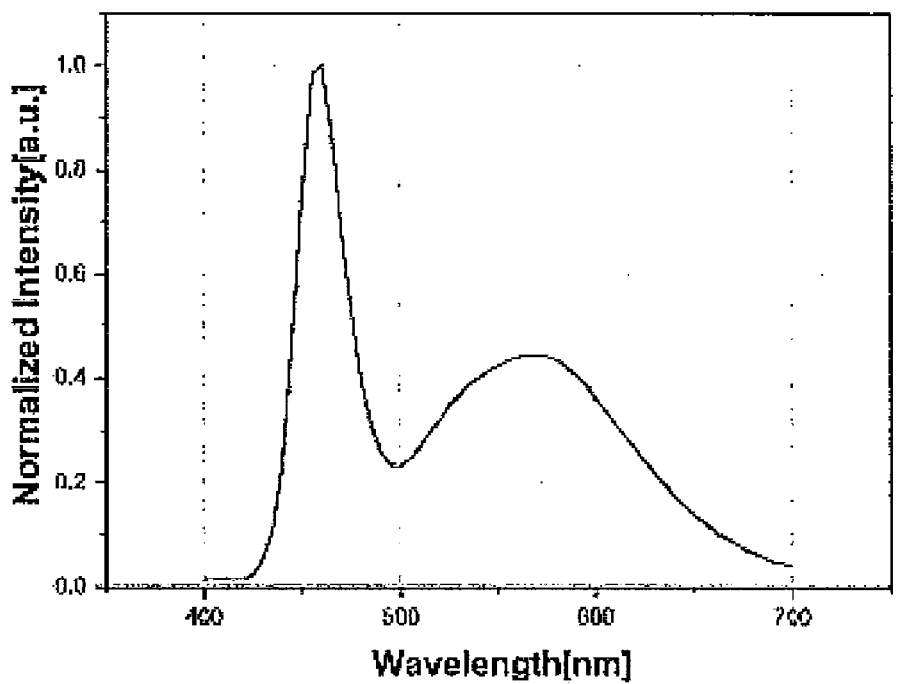

[Figure 13]
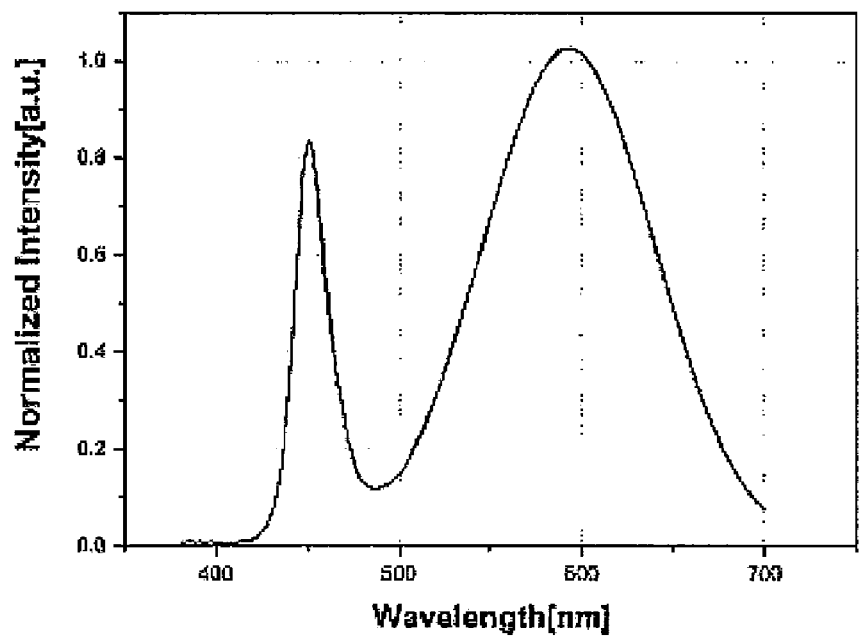
[Figure 14]
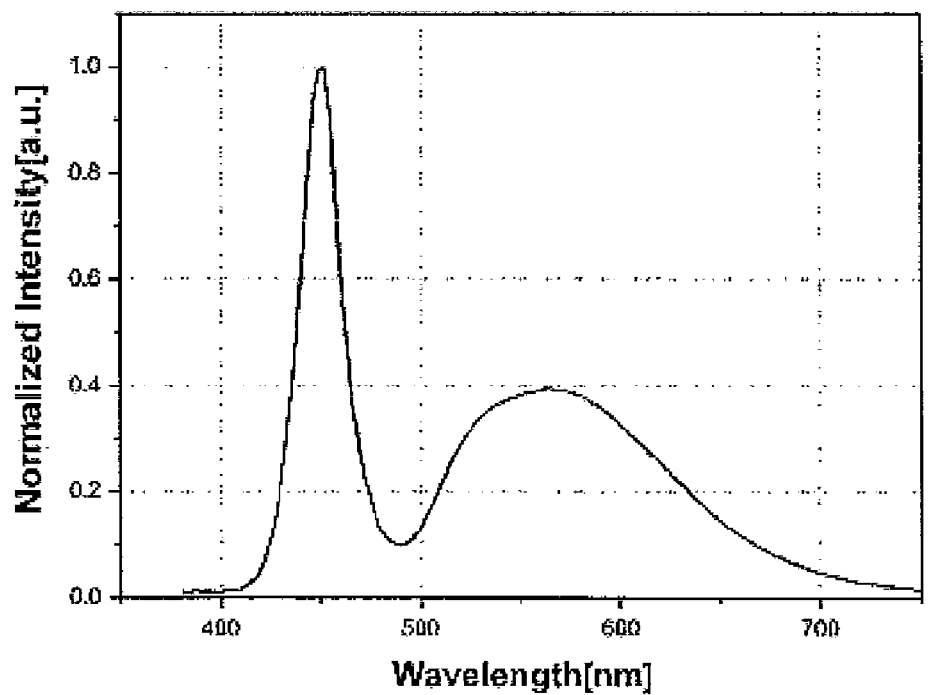

[Figure 15]
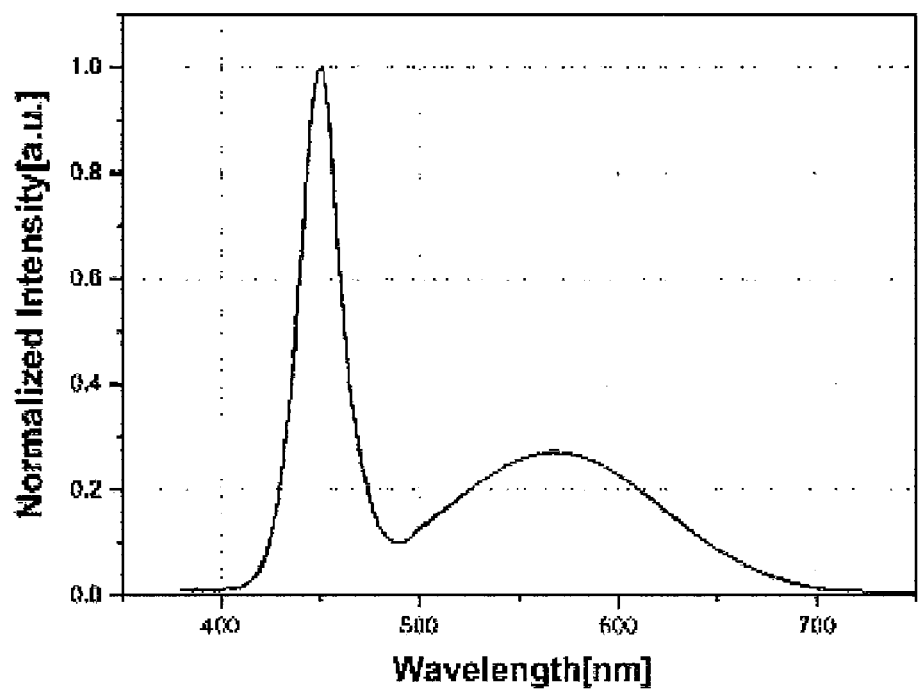
[Figure 16]
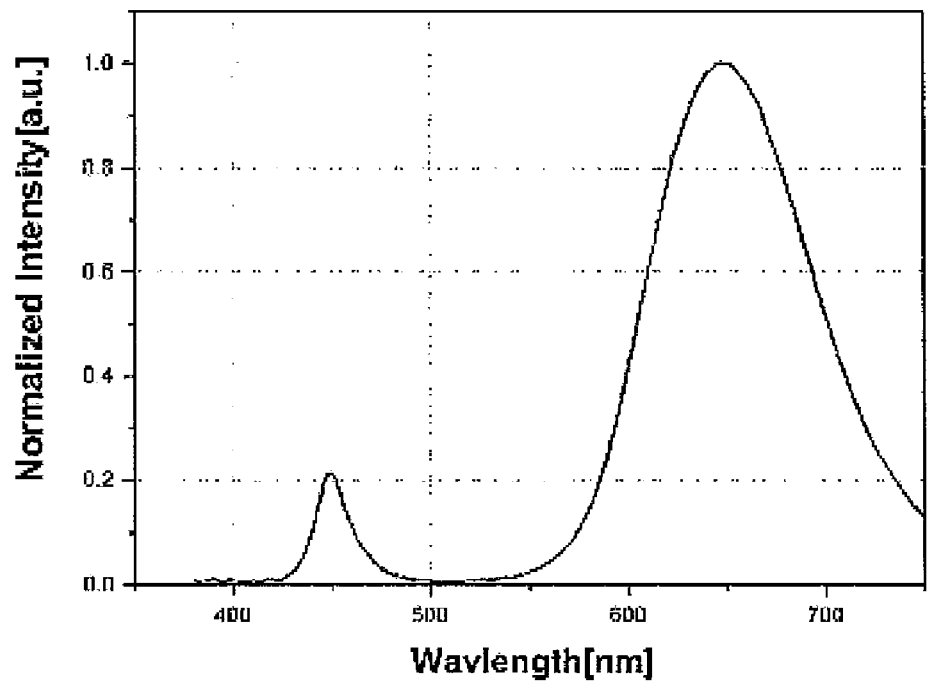

[Figure 17]
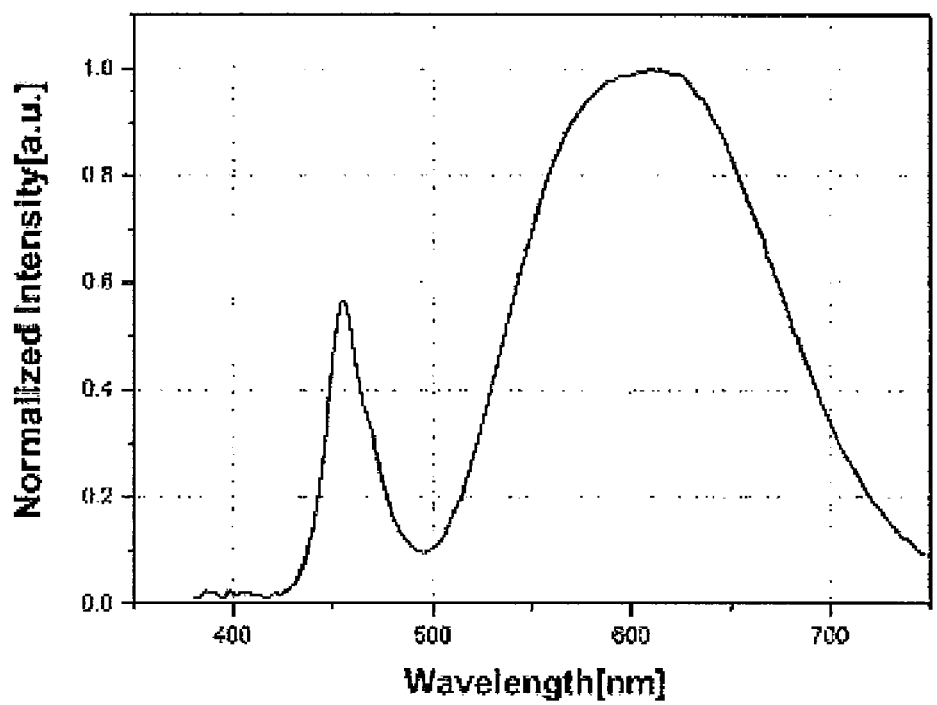
[Figure 18]
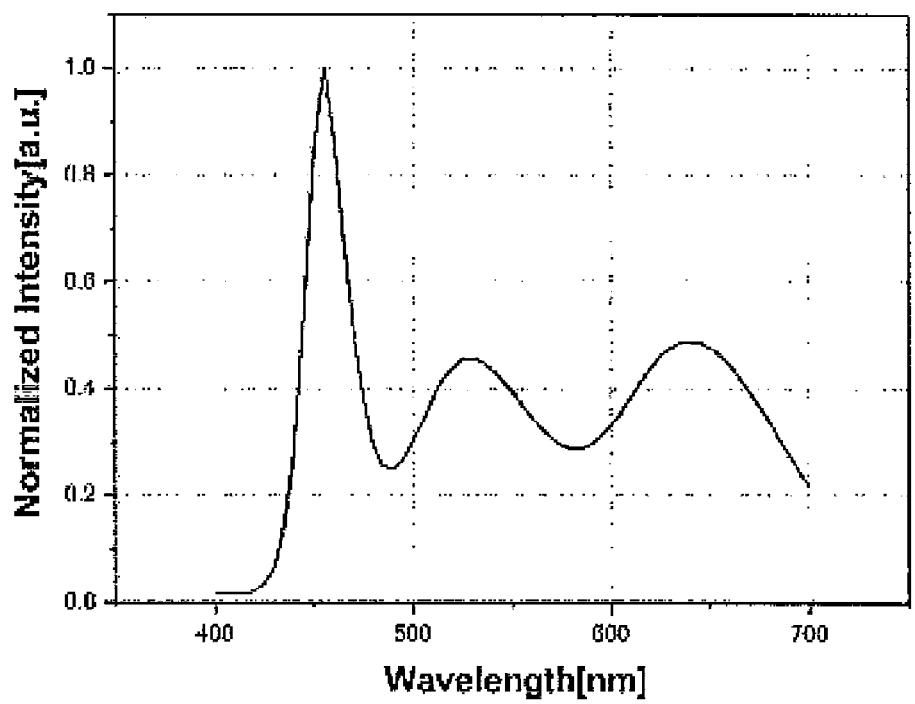

[Figure 19]
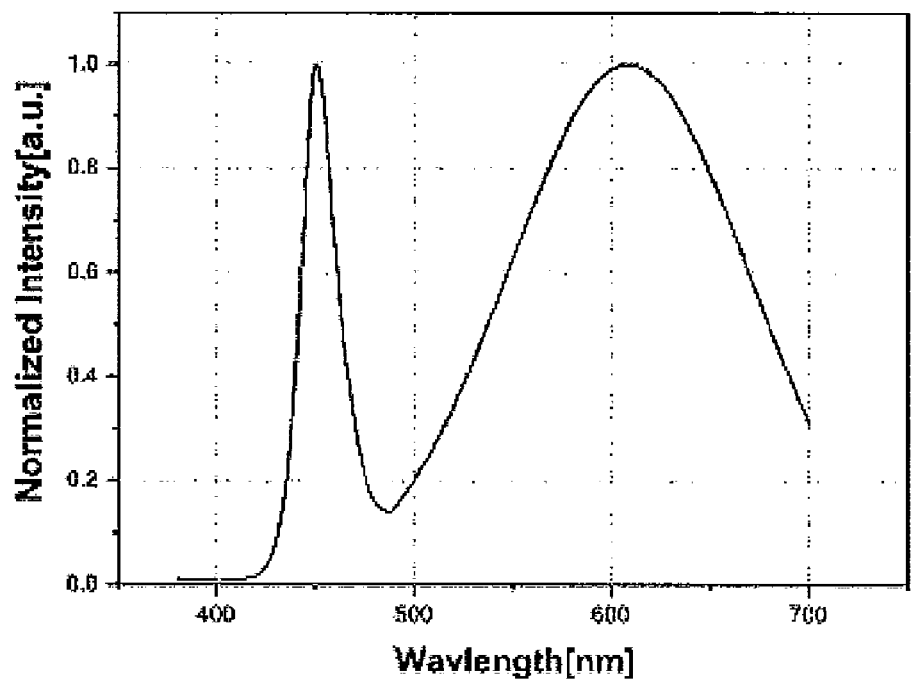
[Figure 20]
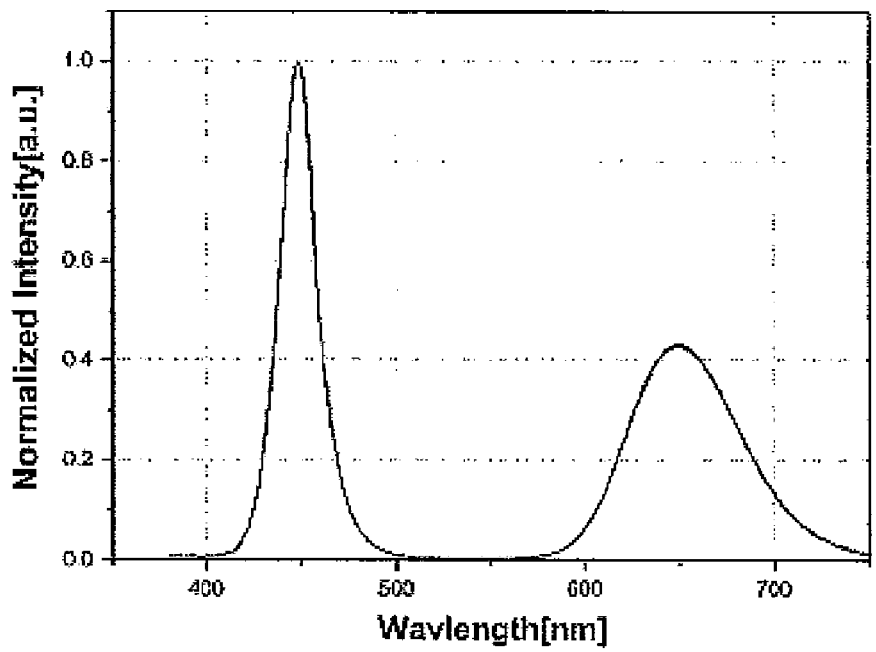

[Figure 21]
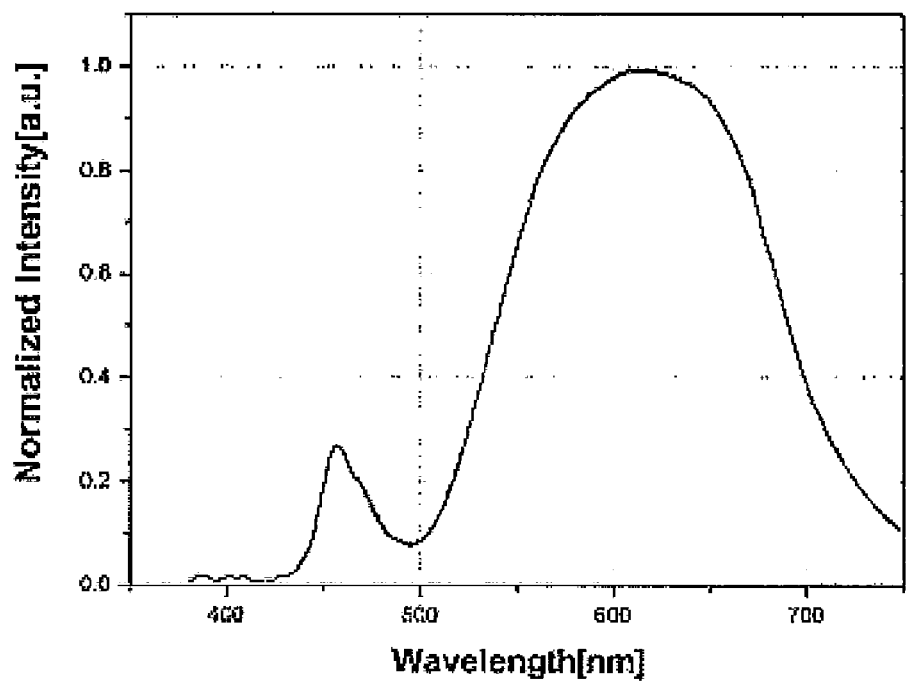
[Figure 22]
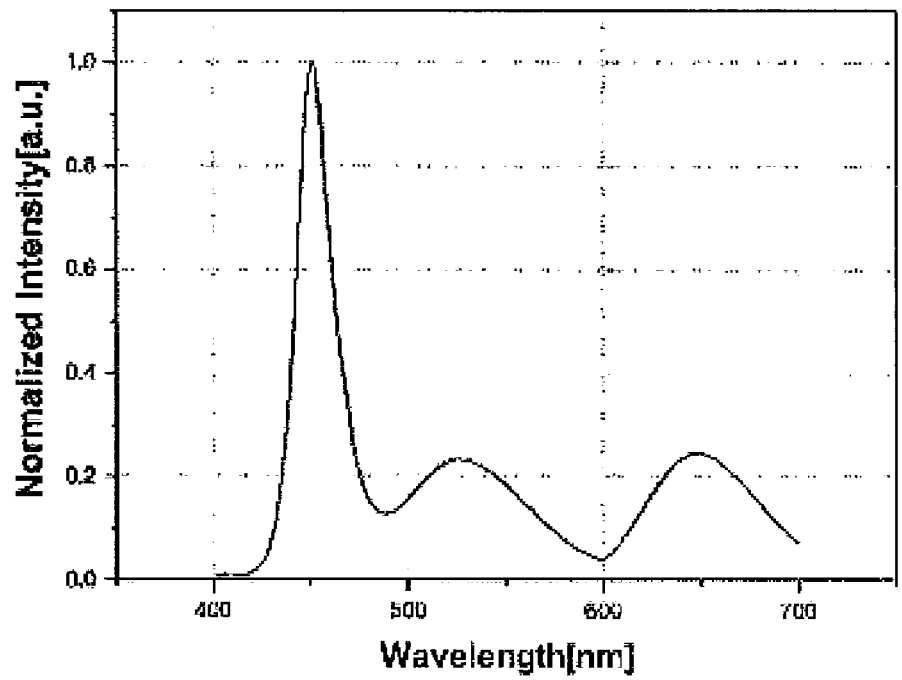

[Figure 23]
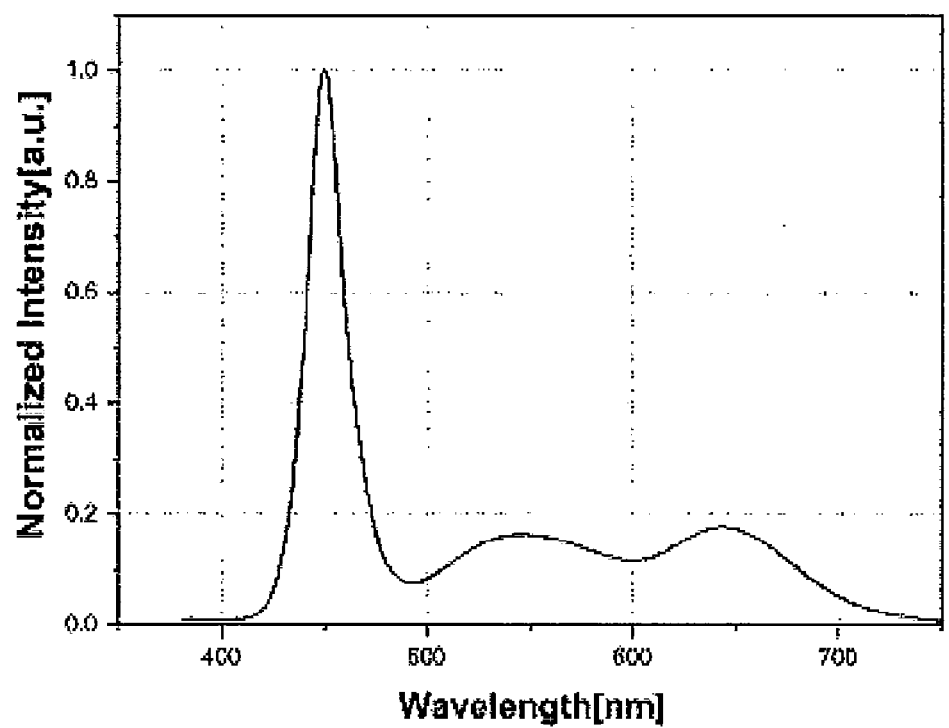

PHOSPHOR MATERIAL, COATING PHOSPHOR COMPOSITION, AND LIGHT EMITTING DEVICE

TECHNICAL FIELD

The embodiment relates to phosphor, coating phosphor composition, a method for preparing the phosphor, and a light emitting device.

BACKGROUND ART

Recently, gallium nitride (GaN)-based white light emitting diode (LED) is actively developed and manufactured throughout the world. In such a GaN-based white LED, blue, green, and red LED chips are simultaneously lightened and then the brightness of the LED chips is adjusted such that variable coloring mixing can be achieved, thereby expressing a white color, or blue and yellow (or orange) LED chips are simultaneously lightened while adjusting the brightness thereof.

However, in the above two multiple chip-type white LED manufacturing methods, the LED chips have different operational voltages, and color coordinates are changed depending on the output of the LED chips which may be vary according to the ambient temperature.

As another method, phosphor may be coated on a blue or a near-UV (ultra violet) LED chip to fabricate a white LED.

In the above method for manufacturing the white LED by coating phosphor, the manufacturing process is more simple and economical, and a light source having a desired color is more simply manufactured through the variable color mixing of three colors using blue, green, and red phosphor, as compared with that of the multiple chip-type white LED manufacturing methods. However, in the phosphor coating method, the primary light emitted from a light emitting device is changed into the secondary light through phosphor, so that the light source using phosphor may have brightness, a correlated color temperature (CCT), and a color rendering index (CRI) varied according to the performance and the application scheme of the phosphor.

Recently, most white LEDs have been manufactured according to the combination of (In)GaN LEDs emitting blue light having a wavelength of about 460 nm and yttrium aluminum garnet (YAG) $Ce^{3+}$ phosphor emitting yellow light.

However, since conventional the (In)GaN LEDs emits blue excitation light having a narrow band, the development of light emitting devices expressing various colors is difficult, and white light may be seriously changed according to the wavelength of blue light. In addition, light emitting efficiency may be excessively lowered in UV excitation light.

DISCLOSURE

Technical Problem

Embodiments of the present invention provide new phosphor, phosphor composition, a method for preparing the phosphor, and a light emitting device using the phosphor.

Embodiments of the present invention provide phosphor, phosphor composition and a light emitting device using the same, and a method for preparing the phosphor, capable of expressing various colors, with a high color temperature and a high CRI.

Technical Solution

According to an embodiment of the present invention, a silicate-based phosphor is expressed in a chemical formula of (4-x-y-z)SrO.xBaO.zCaO.aMgO.2($SiO_2$).b$M_2O_3$:yEu, wherein M is at least one of Y, Ce, La, Nd, Gd, Tb, Yb or Lu, in which $0<x\leq3.95$, $0<y\leq1$, $0\leq z<3.95$, $x+y+z<4$, $0<a<2$, and $0<b<1$.

According to an embodiment of the present invention, a phosphor is obtained by mixing a silicate-based first phosphor, which is expressed in a chemical formula of (4-x-y-z)SrO.xBaO.zCaO.aMgO.2($SiO_2$).b$M_2O_3$:yEu (M is at least one of Y, Ce, La, Nd, Gd, Tb, Yb or Lu, $0<x\leq3.95$, $0<y\leq1$, $0\leq z<3.95$, $x+y+z<4$, $0<a<2$, and $0<b<1$), with a garnet-based phosphor.

According to an embodiment of the present invention, a phosphor is obtained by mixing a silicate-based first phosphor, which is expressed in a chemical formula of (4-x-y-z)SrO.xBaO.zCaO.aMgO.2($SiO_2$).b$M_2O_3$:yEu (M is at least one of Y, Ce, La, Nd, Gd, Tb, Yb or Lu, $0<x\leq3.95$, $0<y\leq1$, $0\leq z<3.95$, $x+y+z<4$, $0<a<2$, and $0<b<1$), with a nitride-based phosphor.

According to an embodiment of the present invention, a phosphor is obtained by mixing a silicate-based first phosphor, which is expressed in a chemical formula of (4-x-y-z)SrO.xBaO.zCaO.aMgO.2($SiO_2$).b$M_2O_3$:yEu (M is at least one of Y, Ce, La, Nd, Gd, Tb, Yb, or Lu, $0<x\leq3.95$, $0<y\leq1$, $0\leq z<3.95$, $x+y+z<4$, $0<a<2$, and $0<b<1$), with a sulfide-based phosphor.

According to an embodiment of the present invention, a coating phosphor composition comprises transparent resin and a silicate-based phosphor expressed in a chemical formula of (4-x-y-z)SrO.xBaO.zCaO.aMgO.2($SiO_2$).b$M_2O_3$:yEu (M is at least one of Y, Ce, La, Nd, Gd, Tb, Yb, or Lu, $0<x\leq3.95$, $0<y\leq1$, $0\leq z<3.95$, $x+y+z<4$, $0<a<2$, and $0<b<1$).

According to an embodiment of the present invention, a method for preparing a silicate-based phosphor comprises the steps of (a) mixing an oxide, nitride, or carbonate of alkaline earth metal including Ba, $SiO_2$, an oxide, nitride, or halide of rare earth metal, and an oxide or halide of Eu which is employed as an activator with each other in a $NH_4F$, $BAF_2$, $CAF_2$, or $MGF_2$ solvent which is employed as a flux, (b) drying the mixture under a temperature in the range of 50° C. to 150° C. for three minutes to 24 hours, (c) thermally treats the resultant under a reduction atmosphere having a temperature in the range of 800° C. to 1500° C. for one hour to 48 hours, (d) obtaining phosphor particles having a predetermined size by pulverizing and distributing an obtained phosphor, and (e) removing a non-reactive material by washing the phosphor particles using a solvent.

According to an embodiment of the present invention, a light emitting device comprises a light emitting diode chip that emits light having a light emitting peak wavelength in a range of 430 nm to 480 nm, a substrate that electrically connects to the light emitting diode chip, a molding member used to mold the light emitting diode chip, and a phosphor that is entirely or partially dispersed in the molding member, wherein the phosphor is a silicate-based phosphor expressed in a chemical formula of (4-x-y-z)SrO.xBaO.zCaO.aMgO.2($SiO_2$).b$M_2O_3$:yEu (M is at least one of Y, Ce, La, Nd, Gd, Tb, Yb or Lu, $0<x\leq3.95$, $0<y\leq1$, $0\leq z<3.95$, $x+y+z<4$, $0<a<2$, and $0<b<1$).

According to an embodiment of the present invention, a light emitting device comprises a light emitting diode chip that emits light having a light emitting peak wavelength in a range of 430 nm to 480 nm, a substrate that electrically connects to the light emitting diode chip, a molding member used to mold the light emitting diode chip, and a phosphor that is entirely or partially dispersed in the molding member, wherein the phosphor comprises a silicate-based first phosphor, which is expressed in a chemical formula of (4-x-y-z) $SrO \cdot xBaO \cdot zCaO \cdot aMgO \cdot 2(SiO_2) \cdot bM_2O_3$:yEu (M is at least one of Y, Ce, La, Nd, Gd, Tb, Yb or Lu, $0<x\leq3.95$, $0<y\leq1$, $0\leq z<3.95$, $x+y+z<4$, $0<a<2$, and $0<b<1$), and a garnet-based second phosphor.

According to an embodiment of the present invention, a light emitting device comprises a light emitting diode chip that emits light having a light emitting peak wavelength in a range of 430 nm to 480 nm, a substrate that electrically connects to the light emitting diode chip, a molding member used to mold the light emitting diode chip, and a phosphor that is entirely or partially dispersed in the molding member, wherein the phosphor comprises a silicate-based first phosphor, which is expressed in a chemical formula of (4-x-y-z) $SrO \cdot xBaO \cdot zCaO \cdot aMgO \cdot 2(SiO_2) \cdot bM_2O_3$:yEu (M is at least one of Y, Ce, La, Nd, Gd, Tb, Yb or Lu, $0<x\leq3.95$, $0<y\leq1$, $0\leq z<3.95$, $x+y+z<4$, $0<a<2$, and $0<b<1$), and a nitride-based second phosphor.

According to an embodiment of the present invention, a light emitting device comprises a light emitting diode chip that emits light having a light emitting peak wavelength in a range of 430 nm to 480 nm, a substrate that electrically connects to the light emitting diode chip, a molding member used to mold the light emitting diode chip, and a phosphor that is entirely or partially dispersed in the molding member, wherein the phosphor comprises a silicate-based first phosphor, which is expressed in a chemical formula of (4-x-y-z) $SrO \cdot xBaO \cdot zCaO \cdot aMgO \cdot 2(SiO_2) \cdot bM_2O_3$:yEu (M is at least one of Y, Ce, La, Nd, Gd, Tb, Yb or Lu, $0<x\leq3.95$, $0<y\leq1$, $0\leq z<3.95$, $x+y+z<4$, $0<a<2$, and $0<b<1$), and a sulfide-based second phosphor.

Advantageous Effects

Phosphor, phosphor composition, and a light emitting device according to an embodiment of the present invention can express various colors with a high color temperature or a high color rendering index.

DESCRIPTION OF DRAWINGS

FIG. 1 is a view showing the structure of a light emitting device;

FIG. 2 is a view showing another structure of the light emitting device according to another embodiment;

FIG. 3 is a graph showing the comparison of the light emitting characteristic of the secondary light of conventional YAG:$Ce^{3+}$ phosphor and the light emitting characteristic of the secondary light of yellow phosphor according to an embodiment of the present invention;

FIG. 4 is a graph showing the comparison of a light emitting device manufactured using yellow phosphor of the first phosphor according to an embodiment of the present invention and a light emitting device manufactured using conventional YAG phosphor in view of light emission spectrum;

FIG. 5 is a graph showing the variation of the light emitting characteristic of the secondary light depending on the change of the contents of Ca and Ba in yellow phosphor of the first phosphor according to an embodiment of the present invention;

FIG. 6 is a graph showing the light emission spectrum of a light emitting device including green phosphor of the first phosphor according to the embodiment;

FIG. 7 is a graph showing the variation of the light emission spectrum of the secondary light of a light emitting device according to the variation of the content of Ba in green phosphor of the first phosphor according to an embodiment of the present invention;

FIG. 8 is a graph showing the light emission spectrum of a light emitting device including orange phosphor of the first phosphor according to an embodiment of the present invention;

FIG. 9 is a graph showing the light emission spectrum of a light emitting device according to the mixture ratio of yellow phosphor and green phosphor according to an embodiment of the present invention;

FIG. 10 is a graph showing the variation of a light emission spectrum of the secondary light emitted from a light emitting device according to the increase of the mixture ratio of green phosphor to yellow phosphor according to an embodiment of the present invention;

FIG. 11 is a graph showing the light emission spectrum of a light emitting device including the mixture of yellow phosphor and orange phosphor according to an embodiment of the present invention;

FIG. 12 is a graph showing the light emission spectrum of the light emitting device including the mixture of green phosphor and orange phosphor according to an embodiment of the present invention;

FIG. 13 is a graph showing the light emission spectrum of a light emitting device including the mixture of yellow phosphor, green phosphor, and orange phosphor according to an embodiment of the present invention;

FIG. 14 is a graph showing a light emitting spectrum of a light emitting device including the garnet-based second phosphor according to an embodiment of the present invention;

FIG. 15 is a graph showing the light emitting spectrum of the light emitting device including the mixture of orange phosphor and garnet-based phosphor according to an embodiment of the present invention;

FIG. 16 is a graph showing the light emission spectrum of a light emitting device including the nitride-based second phosphor according to an embodiment of the present invention;

FIG. 17 is a graph showing the measurement result of the light emitting spectrum of a light emitting device manufactured using the mixture of yellow phosphor of the first phosphor and the second phosphor according to an embodiment of the present invention;

FIG. 18 is a graph showing the measurement result of the light emitting spectrum of a light emitting device manufactured using the mixture of green phosphor of the first phosphor and the second phosphor according to an embodiment of the present invention;

FIG. 19 is a graph showing the measurement result of the light emitting spectrum of a light emitting device manufactured using the mixture of yellow phosphor and the green phosphor of the first phosphor and the second phosphor according to an embodiment of the present invention;

FIG. 20 is a graph showing the light emitting spectrum of a light emitting device including the sulfide-based second phosphor according to an embodiment of the present invention;

FIG. 21 is a graph showing the measurement result of the light emitting spectrum of a light emitting device manufactured using the mixture of yellow phosphor of the first phosphor and the second phosphor according to an embodiment of the present invention;

FIG. 22 is a graph showing the measurement result of the light emitting spectrum of a light emitting device manufactured using the mixture of green phosphor of the first phosphor and the second phosphor according to an embodiment of the present invention; and FIG. 23 is a graph showing the measurement result of the light emitting spectrum of a light emitting device manufactured using the mixture of yellow phosphor and green phosphor of the first phosphor and the second phosphor according to an embodiment of the present invention.

MODE FOR INVENTION

Hereinafter, phosphor, phosphor composition, a light emitting diode, and a method for manufacturing the phosphor according to an embodiment of the present invention will be described with respect to accompanying drawings in detail.

FIG. 1 is a view showing the structure of a light emitting device.

Referring to FIG. 1, the light emitting device includes an InGaN-based light emitting diode (LED) chip 110, a substrate 120, two lead frames 130, a wire 140, a molding member 150, and a phosphor 151. The InGaN-based LED chip 110 emits light having a light emitting peak wavelength in the range of 430 nm to 480 nm. The substrate 120 reflects light, which is emitted from the InGaN-based LED chip 110, upward while supporting the InGaN-based LED chip 110. The two lead frames 130 provide power to the InGaN-based LED chip 110 and are electrically insulated from each other. The wire 140 electrically connects the InGaN-based LED chip 110 to the two lead frames 130. The molding member 150 includes colorless or colored light permeable resin to mold the InGaN-based LED chip 110. The phosphor 151 is entirely or partially dispersed in the molding member 150.

FIG. 2 is a view showing another structure of the light emitting device.

Referring to FIG. 2, the light emitting device includes an InGaN-based light emitting diode (LED) chip 110, a substrate 120, two lead frames 130, a wire 140, a molding member 150, and a phosphor 151. The InGaN-based LED chip 110 emits light having a light emitting peak wavelength in the range of 430 nm to 480 nm. The substrate 120 reflects light, which is emitted from the InGaN-based LED chip 110, upward while supporting the InGaN-based LED chip 110. The two lead frames 130 provide power to the InGaN-based LED chip 110 and are insulated from each other. The wire 140 electrically connects the InGaN-based LED chip 110 to the lead frame 130. The molding member 150 includes colorless or colored light permeable resin to mold the InGaN-based LED chip 110. The phosphor 151 is entirely or partially dispersed in the molding member 150.

In the light emitting device shown in FIG. 2, one wire 140 electrically connects the InGaN-based LED chip 110 to one lead frame 130. The InGaN-based LED chip 110 is mounted on the other lead frame 130, and thus directly connected with the lead frame 130 electrically.

As shown in FIGS. 1 and 2, the light emitting device includes the InGaN-based LED chip 110 provided with power and the phosphor 151 surrounding the InGaN-based LED chip 110. The light emitted from the InGaN-based LED chip 110 is excited through the phosphor 151 to emit the secondary light.

In other words, the light emitting device according to an embodiment of the present invention includes a light source that emits light, the substrate that supports the light source, and the molding member molded around the light source.

The molding member includes light permeable resin, and includes at least one of epoxy resin, silicon resin, urea resin, and acrylic resin. In addition, the molding member may have a single structure or a multiple structure. The molding member includes the first phosphor or phosphor obtained by mixing the first phosphor with the second phosphor, which are described later.

In addition, the embodiment provides coating phosphor composition for the light emitting device including the phosphor 151 and transparent resin. The coating phosphor composition may be obtained by mixing the phosphor 151 with the transparent resin in the weight ratio of 1:2 to 1:10. In detail, the embodiment provides coating phosphor composition including transparent resin and at least one first phosphor selected from the group consisting of silicate-based yellow phosphor, silicate-based green phosphor, silicate-based orange phosphor, the mixture of the silicate-based yellow phosphor and the silicate-based green phosphor, the mixture of the silicate-based yellow phosphor and the silicate-based orange phosphor, the mixture of the silicate-based green phosphor and the silicate-based orange phosphor, and the mixture of the silicate-based yellow phosphor, the silicate-based green phosphor, and the silicate-based orange phosphor.

The embodiment provides coating phosphor composition including transparent resin and phosphor obtained by mixing the first phosphor with the second phosphor. The transparent resin includes at least one of transparent epoxy resin, silicon resin, urea resin, and acrylic resin.

For example, FIG. 6 is a graph showing the mixture of the green phosphor and the transparent epoxy resin having the mixture ratio of 1:3 or 1:5.

In other words, the light emitting device according to the embodiment, the phosphor 151 may include the first phosphor or phosphor obtained by mixing the first phosphor with the second phosphor. For example, the first phosphor may be mixed with the second phosphor at the weight ratio of 1:1 to 1:9 or 9:1 to 1:1. The average size of particles of the phosphor 151 is 20 µm or less. The light emitting device is an illumination unit of secondarily emitting visible light, white light, and green light by employing light source primarily emitted from the InGaN-based LED chip 110 as an energy source.

For example, the InGaN-based LED chip 110 emits blue light as the primary light, and the phosphor 151 is excited by the blue light emitted from the InGaN-based LED chip 110 to emit the secondary light.

In addition, the InGaN-based LED chip 110 emits blue light as the primary light, the first phosphor of the phosphor 151 is excited by the blue light emitted from the InGaN-based LED chip 110 to emit the secondary light, and the second phosphor of the phosphor 151 is excited by the blue light from the InGaN-based LED chip 110 and the secondary light from the first phosphor to emit light having a wavelength longer than those of the light from the InGaN-based LED chip 110 and the secondary light.

The phosphor 151 may be employed for a light emitting diode, a laser diode, a surface light emitting laser diode, an inorganic electroluminescence (IEL), and an organic electroluminescence (EL). According to the embodiment, the phosphor 151 is employed for the light emitting device including the InGaN-based LED chip 110.

Embodiment 1

Silicate-Based First Phosphor, Preparation Method of First Phosphor, and Manufacturing Method of Light Emitting Device using First Phosphor First Phosphor As show in FIGS. 1 and 2, the phosphor 151 surrounding the InGaN-based LED chip 110 may include the following first phosphor.

The first phosphor is silicate-based phosphor expressed in chemical formula 1.

Chemical Formula 1
(4-x-y-z)SrO.xBaO.zCaO.aMgO.2(SiO$_2$).bM$_2$O$_3$:yEu

In chemical formula 1, M is at least one of Y, Ce, La, Nd, Gd, Tb, Yb, or Lu, wherein, 0<x≦3.95, 0<y≦1, 0≦z<3.95, x+y+z<4, 0<a<2, and 0<b<1.

Accordingly, the first phosphor can be expressed in following chemical formulas.

Chemical Formula 2
(4-x-y-z)SrO.xBaO.zCaO.aMgO.2(SiO$_2$).bY$_2$O$_3$:yEu
Chemical Formula 3
(4-x-y-z)SrO.xBaO.zCaO.aMgO.2(SiO$_2$).bCe$_2$O$_3$:yEu
Chemical Formula 4
(4-x-y-z)SrO.xBaO.zCaO.aMgO.2(SiO$_2$).bLa$_2$O$_3$:yEu
Chemical Formula 5
(4-x-y-z)SrO.xBaO.zCaO.aMgO.2(SiO$_2$).bNd$_2$O$_3$:yEu
Chemical Formula 6
(4-x-y-z)SrO.xBaO.zCaO.aMgO.2(SiO$_2$).bGd$_2$O$_3$:yEu
Chemical Formula 7
(4-x-y-z)SrO.xBaO.zCaO.aMgO.2(SiO$_2$).bTb$_2$O$_3$:yEu
Chemical Formula 8
(4-x-y-z)SrO.xBaO.zCaO.aMgO.2(SiO$_2$).bYb$_2$O$_3$:yEu
Chemical Formula 9
(4-x-y-z)SrO.xBaO.zCaO.aMgO.2(SiO$_2$).bLu$_2$O$_3$:yEu If x, y, and z satisfy 0.01≦x<1.0, 0.02≦y≦0.40, 0≦z≦1 and x+y+z<4 in chemical formula 1, the first phosphor is excited by the primary light having a light emitting peak wavelength in the range of 430 nm to 480 nm to emit the secondary light having a light emitting peak wavelength in the range of 540 nm to 600 nm. In here, the first phosphor is called yellow phosphor.

If x, y, and z satisfy 1.0≦x≦3.95, 0.02≦y≦0.40, z=0, and x+y+z<4 in chemical formula 1, the first phosphor is excited by the primary light having a light emitting peak wavelength in the range of 430 nm to 480 nm to emit the secondary light having a light emitting peak wavelength in the range of 480 nm to 540 nm. In here, the first phosphor is called green phosphor.

If x, y, and z satisfy 0.01≦x<1, 0.02≦y≦0.40, 1<z<3.95 and x+y+z<4 in chemical formula 1, the first phosphor is excited by the primary light having a light emitting peak wavelength in the range of 430 nm to 480 nm to emit the secondary light having a light emitting peak wavelength in the range of 570 nm to 620 nm. In here, the first phosphor is called orange phosphor.

The first phosphor may include at least one selected from the group consisting of the yellow phosphor, the green phosphor, the orange phosphor, the mixture of the yellow phosphor and the green phosphor, the mixture of the yellow phosphor and the orange phosphor, the mixture of the green phosphor and the orange phosphor, and the mixture of the yellow phosphor, the green phosphor, and the orange phosphor. In this case, if the green phosphor is mixed with the yellow phosphor, the green phosphor may be mixed with the yellow phosphor at the weight ratio in the range of 1:1 to 1:9, or 9:1 to 1:1 by taking light emitting characteristics into consideration. For example, the weight ratio may be in the range of 1:1 to 1:5 or 5:1 to 1:1.

The first phosphor includes Mg, and at least one of Y, Ce, La, Nd, Gd, Tb, Yb, or Lu to have performance superior to that of YAG:Ce$^{3+}$ phosphor.

Preparation Method of First Phosphor
The first phosphor is prepared through the following steps.
The preparation process of the first phosphor comprises
(a) mixing an oxide, nitride, or carbonate of alkaline earth metal, SiO$_2$, an oxide, nitride, or halide of rare earth metal, and an oxide or halide of Eu, which is employed as an activator, with each other in a NH$_4$F, BaF$_2$, CaF$_2$, or MgF$_2$ solvent, which is employed as a flux;

(b) drying the mixture under a temperature in the range of 50° C. to 150° C. for three minutes to 24 hours, (c) thermally treats the dried mixture under a reduction atmosphere having a temperature in the range of 800° C. to 1500° C. for one hour to 48 hours, (d) obtaining phosphor particles having a predetermined size by pulverizing and distributing the first phosphor, and (e) removing a non-reactive material by washing the particles of the first phosphor using a solvent.

In step (a), the use amount of each material can be adjusted according to a stoichiometric ratio such that chemical formula 1 is satisfied.

In step (c), the temperature of the reduction reaction exceeds the temperature enough to complete the reduction reaction. If a thermal treatment temperature is less than 800° C. at the reduction atmosphere, the crystal of the first phosphor is insufficiently created, so that light emitting efficiency is reduced. If the terminal treatment temperature exceeds 1500° C., over reaction occurs so that brightness may be degraded or the creation of solid-state particles may be difficult. In addition, reduction gas includes nitride gas, with which hydrogen is mixed by 2 to 25 volume %, for the reduction atmosphere.

Since the first phosphor obtained through the step (d) is condensed due to a high thermal treatment temperature, a pulverizing and distributing process is required in order to obtain particles having desired brightness and desired size.

In order to remove a non-reactive material in step (e), at least one polymer solvent such as alcohol and acetone that melts the non-reactive material is used. In order to wash the non-reactive material, a method for putting the first phosphor in the above solvent, mixing the first phosphor with the solvent, and then drying the resultant may be suggested. However, the present invention is not limited thereto. In this case, step (e) of removing a non-reactive material may be performed, and then step (d) of pulverizing and distributing the first phosphor may be performed.

The first phosphor obtained through thermal treatment at the reduction atmosphere includes a small number of a halogen compound, If the halogen compound is not removed, moisture-resistance may be degraded when the light emitting device is manufactured using the first phosphor.

Example of Preparation Method of Yellow Phosphor of First Phosphor 1.07 g SrCO$_3$, 0.43 g BaCO$_3$, 0.07 g MgO, 0.33 g SiO$_2$, 0.25 g Eu$_2$O$_3$, 0.05 g Y$_2$O$_3$, and 0.07 g La$_2$O$_3$ were put in acetone, and the resultant was mixed by using a ball mill for three hours. The mixture was inserted into a dryer having a temperature of 100° C. and then dried for 12 hours so that a solvent was volatilized. The dried mixture was placed in an alumina melting pot and then subject to thermal treatment at the temperature 1200° C. for five hours. At this time, the resultant was sintered while applying nitrogen mixture gas containing 10 volume % of hydrogen at a flow rate of 400 cc/min. The first phosphor having been subject to the thermal treatment was pulverized, and phosphor available for the light emitting device was distributed in the form of powder having the size of 20 μm. Since the first phosphor having been subject to the distributed process includes a non-reactive material, the first phosphor was in the mixture solution of both ethylalcohol and acetone having the ratio of 1:1, and then subject to ultrasonic washing for 30 minutes. Then, the resultant was dried, so that alkaline earth silicate-based yellow phosphor having the chemical formula of (4-x-y-z)SrO.xBaO.zCaO.aMgO.2(SiO$_2$).bM$_2$O$_3$:yEu$^2$ (wherein, x=0.65, y=0.05, z=0, a=1, b=0.2, and M=Y, or La) was prepared.

Example of Preparation Method of Green Phosphor of First Phosphor 1.32 g SrCO$_3$, 0.82 g BaCO$_3$, 0.13 g MgO, 0.02 g Eu$_2$O$_3$, 0.40 g SiO$_2$, and 0.03 g Y$_2$O$_3$ were put in acetone, and the resultant was mixed by using a ball mill for three hours. The mixture was inserted into a dryer having the temperature of 150° C. and then dried for 12 hours so that a solvent was volatilized. The dried mixture was placed in an alumina melting pot and then subject to thermal treatment at the temperature 1400° C. for six hours. At this time, the mixture had been subject to thermal treatment while applying mixture gas, in which 10 volume % of hydrogen was mixed with 90 volum % of nitrogen, at a flow rate of 500 cc/min. The first phosphor having been subject to the thermal treatment was pulverized, and phosphor available for the light emitting device was distributed in the form of powder having the size of 20 μm. The first phosphor having been subject to the distribution was in the mixture solution of both ethylalcohol and acetone having the ratio of 1:1, and then subject to ultrasonic cleaning for 30 minutes in order to remove a non-reactive material. Then, the resultant was dried, so that green phosphor having the chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y) was prepared.

Example of Preparation Method of Orange Phosphor of First Phosphor 0.73 g $SrCO_3$, 0.01 g $BaCO_3$, 0.13 g MgO, 0.45 g CaO, 0.4 g $SiO_2$, 0.03 g $Y_2O_3$, and 0.17 g $Eu_2O_3$ were put in acetone, and the resultant was mixed by using a ball mill for three hours. The mixture was inserted into a dryer having the temperature of 150° C. and then dried for 12 hours so that a solvent was volatilized. The dried mixture was placed in an alumina melting pot and then subject to thermal treatment at the temperature 1350° C. for 12 hours. At this time, the mixture had been subject to thermal treatment while applying mixture gas, in which 25 volume % of hydrogen was mixed with 75 volum % of nitrogen at a flow rate of 1000 cc/min. The first phosphor having been subject to the thermal treatment was pulverized, and phosphor available for the light emitting device was distributed in the form of powder having the size of 20 μm. The first phosphor having been subject to the distribution process was in the mixture solution of both ethylalcohol and acetone having the ratio of 1:1, and then subject to ultrasonic cleaning for 30 minutes in order to remove a non-reactive material. Then, the resultant was dried, so that orange phosphor having the chemical formula of $(4-x-y-z)SrO.xBaO.zCaO.aMgO.2(SiO_2).bM_2O_3:yEu$ (wherein, x=0.01, y=0.1, z=2.4, a=1, b=0.1, and M=Y) was prepared.

Example of Preparation Method of Mixture of Yellow Phosphor and Green Phosphor of First Phosphor The yellow phosphor having chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La) and the green phosphor having chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y), which were prepared through the above method, were mixed with each other at the weight ratio of 1:3.

Example of Preparation Method of Mixture of Orange Phosphor and Yellow Phosphor of First Phosphor The yellow phosphor having chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La) and the orange phosphor having chemical formula of $(4-x-y-z)SrO.xBaO.zCaO.aMgO.2(SiO_2).bM_2O_3:yEu$ (wherein, x=0.01, y=0.1, z=2.4, a=1, b=0.1, and M=Y), which were prepared through the above method, were mixed with each other at the weight ratio of 1:1.

Example of Preparation Method of Mixture of Green Phosphor and Orange Phosphor of First Phosphor The green phosphor having chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y), and the orange phosphor having chemical formula of $(4-x-y-z)SrO.xBaO.zCaO.aMgO.2(SiO_2).bM_2O_3:yEu$ (wherein, x=0.01, y=0.1, z=2.4, a=1, b=0.1, and M=Y), which were prepared through the above method, were mixed with each other at the weight ratio of 9:1.

Example of Preparation Method of Mixture of Yellow Phosphor, Green Phosphor, and Orange Phosphor of First Phosphor The yellow phosphor having chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La), the green phosphor having chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y), and the orange phosphor having chemical formula of $(4-x-y-z)SrO.xBaO.zCaO.aMgO.2(SiO_2).bM_2O_3:yEu$ (wherein, x=0.01, y=0.1, z=2.4, a=1, b=0.1, and M=Y), which were prepared through the above method, were mixed with each other at the weight ratio of 5:2:3.

Example of Manufacturing Light Emitting Device using Yellow Phosphor of First Phosphor Referring to FIGS. 1 and 2, the light emitting device was manufactured by employing alkaline earth silicate-based yellow phosphor, having a chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La), of the first phosphor for the InGaN-based LED 110 having a light emitting peak wavelength in the range of 430 nm to 480 nm.

In detail, the phosphor 151 was mixed with the molding member 150 including light permeable epoxy resin, and then the resultant was molded to surround the InGaN-based LED chip 110.

The phosphor 151 emits the secondary light having a peak wavelength in the range of 540 nm to 600 nm while being excited by blue light having a wavelength of 460 nm emitted from the InGaN-based LED chip 110.

FIG. 3 is a graph showing the comparison of the light emitting characteristic of the secondary light of conventional YAG:$Ce^{3+}$ phosphor and the light emitting characteristic of the secondary light of yellow phosphor. In other words, FIG. 3 shows the light emitting characteristic of the secondary light of yellow phosphor obtained by selecting one of Y, Ce and La as M and changing the value of b in chemical formula 1.

When manufacturing phosphor through a detailed example of a preparation method of yellow phosphor of the first phosphor by selecting Y and La as M and the contents of Y and LA as 0.2 mol and 0.1 mol, respectively, in chemical formula 1, the maximum light emitting efficiency can be obtained in a peak wavelength of 550 nm (see, graph e).

FIG. 4 is a graph showing the comparison of the light emitting device manufactured using yellow phosphor of the first phosphor according to the embodiment and a conventional light emitting device manufactured using YAG phosphor in view of light emission spectrum.

The yellow phosphor of the first phosphor emits the secondary light having a peak wavelength in the range of 540 nm to 600 nm, and has a light emitting characteristic superior to that of the conventional YAG phosphor.

FIG. 5 is a graph showing the variation of the light emitting characteristic of the secondary light in accordance with the change of the contents of Ca and Ba in yellow phosphor of the first phosphor according to the embodiment.

The yellow phosphor of the first phosphor according to the embodiment may be prepared by changing the content ratio of Ca to Ba to Sr in chemical formula 1. As a result, the light emitting device including the yellow phosphor may have various light emitting characteristics capable of emitting various color light ranging from bluish white light to reddish white light.

When the content (x value) of Ba and the content (z value) of Ca approximate to 1 and 0, respectively, in chemical formula 1, light emitted from the yellow phosphor has a peak wavelength approximating to 540 nm.

A light emitting device, which is manufactured using phosphor having a light characteristic of emitting light with the peak wavelength approximating to 540 nm, emits near bluish white light. In order for the light emitting device to emit bluish white light, the content (x value) of Ba and the content (z value) of Ca may be selected in the range of 0 to 0.1.

Meanwhile, when the content (x value) of Ba and the content (z value) of Ca approximate to 0.01 and 1.0, respectively, in chemical formula 1, light emitted from the yellow phosphor has a peak wavelength approximating to 600 nm.

A light emitting device, which is manufactured using phosphor having a light characteristic of emitting light with the peak wavelength approximating to 600 nm, emits near reddish white light. In order for the light emitting device to emit reddish white light, the content (x value) of Ba may be selected in the range 0.01 to 0.3, and the content (z value) of Ca may be selected in the range of 0.5 to 0.8.

Example of Manufacturing Light Emitting Device using Green Phosphor of First Phosphor Referring to FIGS. 1 and 2, the light emitting device was manufactured by employing green phosphor, having a chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y), of the first phosphor for the InGaN-based LED 110 having a light emitting a peak wavelength in the range of 430 nm to 480 nm.

In detail, the phosphor 151 was mixed with the molding member 150 including light permeable epoxy resin, and then the resultant was molded to surround the InGaN-based LED chip 110.

The phosphor 151 emits light having a peak wavelength in the range of 480 nm to 540 nm while being excited by blue light having a wavelength of 465 nm emitted from the InGaN-based LED chip 110.

FIG. 6 is a graph showing the light emission spectrum of a light emitting device including green phosphor of the first phosphor according to the embodiment.

In FIG. 6, the light emission spectrum according to the mixture ratio of the green phosphor to epoxy resin used for the molding member 150 is shown. As the content of the green phosphor becomes greater relative to the content the epoxy resin, the intensity of light is increased. In FIG. 6, the emission of the secondary light having a peak wavelength of 505 nm is disclosed.

FIG. 7 is a graph showing the variation of the light emission spectrum of the secondary light of the light emitting device according to the variation of the content of Ba in the green phosphor of the first phosphor according to the embodiment.

The green phosphor of the first phosphor according to the embodiment may be prepared such that the green phosphor has a light emitting characteristic of emitting bluish green light to green light according to the content ratio of Ba to Sr in chemical formula.

When the content (x value) of Ba approximates to 3.95 in chemical formula 1, light emitted from the green phosphor has a peak wavelength approximating to 480 nm.

A light emitting device, which is manufactured using phosphor having a light emitting characteristic of emitting light having the peak wavelength approximating to 480 nm, emits near bluish green light. In order for the light emitting device to emit bluish green light, the content (x value) of Ba may be selected in the range of 2.0 to 3.95.

Meanwhile, when the content (x value) of Ba approximates to 1 in chemical formula 1, light emitted from the green phosphor has a peak wavelength approximating to 540 nm.

A light emitting device, which is manufactured using phosphor having a light emitting characteristic of emitting light having the peak wavelength approximating to 540 nm, emits near green light. In order for the light emitting device to emit green light, the content (x value) of Ba may be selected in the range 1.0 to 2.0.

Example of Manufacturing Light Emitting Device using Orange Phosphor of First Phosphor Referring to FIGS. 1 and 2, the light emitting device was manufactured by employing orange phosphor, having a chemical formula of $(4-x-y-z)SrO.xBaO.zCaO.aMgO.2(SiO_2).bM_2O_3:yEu$ (wherein, x=0.01, y=0.1, z=2.4, a=1, b=0.1, and M=Y), of the first phosphor for the InGaN-based LED 110 having a light emitting a peak wavelength in the range of 430 nm to 480 nm.

In detail, the phosphor 151 was mixed with the molding member 150 including light permeable epoxy resin, and then the resultant was molded to surround the InGaN-based LED chip 110.

The phosphor 151 emits light having a peak wavelength in the range of 570 nm to 620 nm while being excited by blue light having a wavelength of 465 nm emitted from the InGaN-based LED chip 110.

FIG. 8 is a graph showing the light emission spectrum of the light emitting device including the orange phosphor of the first phosphor according to the embodiment.

As shown in FIG. 8, the light emitting device of the secondary light having a peak wavelength of 590 nm is disclosed.

Example of Manufacturing Light Emitting Device using Mixture of Yellow Phosphor and Green Phosphor of First Phosphor Referring to FIGS. 1 and 2, the light emitting device was manufactured by employing phosphor, which was obtained by mixing yellow phosphor having a chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La) and green phosphor having a chemical formula of $(4-x-y-z)SrO.xBaO.zCaO.aMgO.2(SiO_2).bM_2O_3:yEu^2$ (wherein, x=1.25, y=0.05, z=0, a=1, b=0.1, and M=Y) of the above first phosphor at the weight ratio 1:3, for the InGaN-based LED chip 110 having a light emitting a peak wavelength in the range of 430 nm to 480 nm.

In detail, the phosphor 151 was mixed with the molding member 150 including light permeable epoxy resin, and then the resultant was molded to surround the InGaN-based LED chip 110.

The phosphor 151 emits light having peak wavelengths in the range of 480 nm to 540 nm and 540 nm to 600 nm while being excited by blue light having a wavelength of 465 nm emitted from the InGaN-based LED chip 110.

The mixture of the yellow phosphor and the green phosphor is excited by the blue light emitted from the light emitting diode chip 110 so that light having a peak wavelength in the range of 540 nm to 600 nm is emitted from the yellow phosphor, and light having a peak wavelength in the range of 480 nm to 540 nm is emitted from the green phosphor. In addition, a portion of the blue light emitted from the light emitting diode chip 110 is transmitted.

FIG. 9 is a graph showing the light emission spectrum of the light emitting device according to the mixture ratio of the yellow phosphor and the green phosphor, and FIG. 10 is a graph showing the variation of the light emission spectrum of the secondary light emitted from the light emitting device according to the increase of the mixture ratio of the green phosphor to the yellow phosphor.

As described above, the color coordinate, the color temperature, and the color rendering index of the light emitting from a white light emitting device can be adjusted by changing the mixture ratio of the green phosphor to the yellow phosphor.

As shown in FIG. 9, the light emitting device of the secondary light having peak wavelengths of 510 nm and 575 nm is disclosed.

Example of Manufacturing Light Emitting Device using Mixture of Orange Phosphor and Yellow Phosphor of First Phosphor Referring to FIGS. 1 and 2, the light emitting device was manufactured by employing phosphor, which was obtained by mixing yellow phosphor having a chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La) and orange phosphor having a chemical formula of $(4-x-y-z)SrO.xBaO.zCaO.aMgO.2(SiO_2).bM_2O_3:yEu$ (in this case, x=0.01, y=0.1, z=2.4, a=1, b=0.1, and M=Y) of the above first phosphor at the weight ratio 1:1, for the InGaN-based LED chip 110 having a light emitting a peak wavelength in the range of 430 nm to 480 nm.

In detail, the phosphor 151 was mixed with the molding member 150 including light permeable epoxy resin, and then the resultant was molded to surround the InGaN-based LED chip 110.

FIG. 11 is a graph showing the light emission spectrum of a light emitting device including the mixture of the yellow phosphor and the orange phosphor.

The phosphor 151 emits light, which has peak wavelengths in the range of 540 nm to 600 nm and 570 nm to 620 nm, while being excited by blue light having a wavelength of 465 nm generated from the InGaN-based LED chip 110.

As shown in FIG. 11, the light emitting device of emitting the secondary light having a peak wavelength of 590 nm is disclosed.

Example of Manufacturing Light Emitting Device using Mixture of Green Phosphor and Orange Phosphor of First Phosphor Referring to FIGS. 1 and 2, the light emitting device was manufactured by employing phosphor, which was obtained by mixing green phosphor having a chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y) and orange phosphor having a chemical formula of $(4-x-y-z)SrO.xBaO.zCaO.aMgO.2(SiO_2).bM_2O_3:yEu$ (wherein, x=0.01, y=0.1, z=2.4, a=1, b=0.1, and M=Y) of the above first phosphor at the weight ratio 9:1, for the InGaN-based LED chip 110 having a light emitting a peak wavelength in the range of 430 nm to 480 nm.

In detail, the phosphor 151 was mixed with the molding member 150 including light permeable epoxy resin, and then the resultant was molded to surround the InGaN-based LED chip 110.

FIG. 12 is a graph showing the light emission spectrum of the light emitting device including the mixture of the green phosphor and the orange phosphor.

The phosphor 51 emits light, which has peak wavelengths in the range of 480 nm to 540 nm and 570 nm to 620 nm, while being excited by blue light having a wavelength of 465 nm emitted from the InGaN-based LED chip 110.

As shown in FIG. 12, the light emitting device of emitting the secondary light having a peak wavelength of 570 nm is disclosed.

Example of Manufacturing Light Emitting Device using Mixture of Yellow Phosphor, Green Phosphor, and Orange Phosphor of First Phosphor Referring to FIGS. 1 and 2, the light emitting device was manufactured by employing phosphor, which was obtained by mixing yellow phosphor having a chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La), green phosphor having a chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y), and orange phosphor having a chemical formula of $(4-x-y-z)SrO.xBaO.zCaO.aMgO.2(SiO_2).bM_2O_3:yEu$ (wherein, x=0.01, y=0.1, z=2.4, a=1, b=0.1, and M=Y) of the above first phosphor at the weight ratio 5:2:3, for the InGaN-based LED chip 110 having a light emitting a peak wavelength in the range of 430 nm to 480 nm.

In detail, the phosphor 151 was mixed with the molding member 150 including light permeable epoxy resin and then, the resultant was molded to surround the InGaN-based LED chip 110.

FIG. 13 is a graph showing the light emission spectrum of the light emitting device including the mixture of yellow phosphor, green phosphor, and orange phosphor.

The phosphor 151 emits light, which has peak wavelengths in the range of 480 nm to 540 nm and 540 nm to 600 nm, and 570 nm to 620 nm, while being excited by blue light having a wavelength of 456 nm emitted from the InGaN-based LED chip 110.

As shown in FIG. 13, the light emitting device of emitting the secondary light having a peak wavelength of 590 nm is disclosed.

Embodiment 2

Garnet-Based Second Phosphor, Preparation Method of Second Phosphor, and Manufacturing of Light Emitting Device using Mixture of First Phosphor and Second Phosphor First Phosphor The first phosphor and the preparation method of the first phosphor are identical to those of embodiment 1.

Second Phosphor

The second phosphor is garnet-based phosphor expressed in chemical formula 10.

Chemical Formula 10

$x(M1_2O_3).y(M2_2O_3):zRE$

In chemical formula 10, M1 is at least one of Y, Tb, La, Yb, Sm, or Lu, and M2 is at least one of Al or Ga, and RE is at least one of Pr, Gd or Ce, wherein $0<x\leqq1.5$, $0<y\leqq2.5$, and $0<z\leqq1$.

Chemical Formula 11
$x(Y_2O_3).y(Al_2O_3):zPr$
Chemical Formula 12
$x(Y_2O_3).y(Al_2O_3):zGd$
Chemical Formula 13
$x(Y_2O_3).y(Al_2O_3):zCe$
Chemical Formula 14
$x(Y_2O_3).y(Ga_2O_3):zPr$
Chemical Formula 15
$x(Y_2O_3).y(Ga_2O_3):zGd$
Chemical Formula 16
$x(Y_2O_3).y(Ga_2O_3):zCe$
Chemical Formula 17
$x(Tb_2O_3).y(Al_2O_3):zPr$
Chemical Formula 18
$x(Tb_2O_3).y(Al_2O_3):zGd$
Chemical Formula 19
$x(Tb_2O_3).y(Al_2O_3):zCe$
Chemical Formula 20
$x(Tb_2O_3).y(Ga_2O_3):zPr$
Chemical Formula 21
$x(Tb_2O_3).y(Ga_2O_3):zGd$
Chemical Formula 22
$x(Tb_2O_3).y(Ga_2O_3):zCe$
Chemical Formula 23
$x(La_2O_3).y(Al_2O_3):zPr$
Chemical Formula 24
$x(La_2O_3).y(Al_2O_3):zGd$
Chemical Formula 25
$x(La_2O_3).y(Al_2O_3):zCe$
Chemical Formula 26
$x(La_2O_3).y(Ga_2O_3):zPr$ Chemical Formula 27
$x(La_2O_3).y(Ga_2O_3):zGd$
Chemical Formula 28
$x(La_2O_3).y(Ga_2O_3):zCe$
Chemical Formula 29
$x(Yb_2O_3).y(Al_2O_3):zPr$
Chemical Formula 30
$x(Yb_2O_3).y(Al_2O_3):zGd$
Chemical Formula 31
$x(Yb_2O_3).y(Al_2O_3):zCe$
Chemical Formula 32
$x(Yb_2O_3).y(Ga_2O_3):zPr$
Chemical Formula 33
$x(Yb_2O_3).y(Ga_2O_3):zGd$
Chemical Formula 34
$x(Yb_2O_3).y(Ga_2O_3):zCe$
Chemical Formula 35
$x(Sm_2O_3).y(Al_2O_3):zPr$
Chemical Formula 36
$x(Sm_2O_3).y(Al_2O_3):zGd$
Chemical Formula 37
$x(Sm_2O_3).y(Al_2O_3):zCe$
Chemical Formula 38
$x(Sm_2O_3).y(Ga_2O_3):zPr$
Chemical Formula 39
$x(Sm_2O_3).y(Ga_2O_3):zGd$
Chemical Formula 40
$x(Sm_2O_3).y(Ga_2O_3):zCe$
Chemical Formula 41
$x(Lu_2O_3).y(Al_2O_3):zPr$
Chemical Formula 42
$x(Lu_2O_3).y(Al_2O_3):zGd$
Chemical Formula 43
$x(Lu_2O_3).y(Al_2O_3):zCe$
Chemical Formula 44
$x(Lu_2O_3).y(Ga_2O_3):zPr$
Chemical Formula 45
$x(Lu_2O_3).y(Ga_2O_3):zGd$
Chemical Formula 46
$x(Lu_2O_3).y(Ga_2O_3):zCe$ Preparation Method of Second Phosphor The second phosphor is prepared through the following steps.

The preparing process of the second phosphor includes (a) mixing oxide having trivalent cation with rare earth oxide having trivalent cation, which is an activator, by using acetone, (b) drying the mixture under a temperature of 50° C. to 150° C. for 3 minutes to 24 hours, (c) thermally treating the dried mixture at a hydrogen/nitrogen mixture gas atmosphere having a temperature in the range of 1400° C. to 1700° C. for one hour to 48 hours, (d) obtaining a phosphor particle having a predetermined size by pulverizing or distributing the phosphor, and (e) washing the phosphor particles by using a solvent to remove a non-reactive material.

Example of Preparation Method of Second Phosphor 1.52 g $Y_2O_3$, 1.27 g $Al_2O_3$, and 0.25 g $CeO_2$ were mixed with acetone by using a ball mill for three hours. The mixture was inserted into a dryer having a temperature of 100° C. and then dried for 12 hours so that a solvent was volatilized. The dried mixture was placed in an alumina melting pot and then subject to thermal treatment at the temperature 1500° C. for five hours. At this time, the resultant was sintered while applying nitrogen mixture gas containing 15 volume % of hydrogen at a flow rate of 500 cc/min. The phosphor having been subject to the thermal treatment was pulverized, and phosphor having a size available for the light emitting device was distributed in the form of powder having the size of 20 μm, so that garnet-based phosphor having a chemical formula of $x(M1_2O_3).y(M2_2O_3):zRE$ (wherein, x=1.35, y=2.5, z=0.3, M1=Y, M2=Al, and RE=Ce) was prepared.

Light Emitting Characteristic of Second Phosphor

FIG. 14 is a graph showing a light emitting spectrum of a light emitting device including the garnet-based second phosphor.

As shown in FIG. 14, the second phosphor emits the secondary light, which has a peak wavelength in the range of 530 nm to 600 nm, while being excited by blue light having a wavelength of 465 nm, which is emitted from the InGaN-based LED chip 110.

Example of Mixture of Orange Phosphor of First Phosphor and Second Phosphor

The orange phosphor having a chemical formula of $(4-x-y-z)SrO.xBaO.zCaO.aMgO.2(SiO_2).bM_2O_3:yEu$ (wherein, x=0.01, y=0.1, z=2.4, a=1, b=0.1, M=Y) and the garnet-based phosphor having a chemical formula of $x(M1_2O_3).y(M2_2O_3):zRE$ (wherein, x=1.35, y=2.5, z=0.3, M1=Y, M2=Al, RE=Ce), which were prepared through the above method, were mixed with each other at the weight ratio of 2:8.

Example of Manufacturing Light Emitting Device using Mixture of Orange Phosphor of First Phosphor and Second Phosphor Referring to FIGS. 1 and 2, the light emitting device was manufactured by employing the mixture of the orange phosphor, which has a chemical formula of $(4-x-y-z)SrO.xBaO.zCaO.aMgO.2(SiO_2).bM_2O_3:yEu$ (wherein, x=0.01, y=0.1, z=2.4, a=1, b=0.1, M=Y), of the first phosphor and the garnet-based phosphor, which has a chemical formula of $x(M1_2O_3).y(M2_2O_3):zRE$ (wherein, x=1.35, y=2.5, z=0.3, M1=Y, M2=Al, RE=Ce), having the weight ratio of 2:8 for the InGaN-based LED 110 having a light emitting a peak wavelength in the range of 430 nm to 480 nm.

In detail, the phosphor 151 was mixed with the molding member 150 including light permeable epoxy resin, and then the resultant was molded to surround the InGaN-based LED chip 110.

FIG. 15 is a graph showing the light emitting spectrum of the light emitting device including the mixture of the orange phosphor and the garnet-based phosphor.

The phosphor 151 emits the secondary light having peak wavelengths in the range of 530 nm to 600 nm and 570 nm to 620 nm while being excited by blue light having a wavelength of 465 nm emitted from the InGaN-based LED chip 110.

As shown in FIG. 15, the light emitting device of emitting the secondary light having a peak wavelength of 560 nm is disclosed.

Embodiment 3

Nitride-Based Second Phosphor, Preparation Method of Second Phosphor, and Manufacturing of Light Emitting Device using Mixture of First Phosphor and Second Phosphor First Phosphor The first phosphor and the preparation method of the first phosphor are identical to those of embodiment 1.

Second Phosphor

The second phosphor is nitride-based phosphor expressed in chemical formula 47 or 48.

Chemical Formula 47

$(2-a-b-c-d)SrN.aMgN.bCaN.cBaN.(Si_5N_8):dEu$

In chemical formula 47, $0 \leq a < 2$, $0 \leq b < 2$, $0 \leq c < 2$, $0 < d \leq 1$, and $a+b+c+d<2$.

Chemical Formula 48

$(3-a-b-c-d)CaN.aMgN.bSrN.cBaN.3(XN).(Z_3N_4):dEu$

In chemical formula 48, X is at least one of Al or Ga, and Z is at least one of Si or Ge, wherein $0 \leq a < 3$, $0 \leq b < 3$, $0 \leq c < 3$, $0 < d \leq 1$ and $a+b+c+d<3$.

Accordingly, the expressions of the second phosphor of chemical formula 48 are as follows.

Chemical Formula 49
(3-a-b-c-d)CaN.aMgN.bSrN.cBaN.3(AlN).(Si$_3$N$_4$):dE

Chemical Formula 50
(3-a-b-c-d)CaN.aMgN.bSrN.cBaN.3(AlN).(Ge$_3$N$_4$):dEu

Chemical Formula 51
(3-a-b-c-d)CaN.aMgN.bSrN.cBaN.3(GaN).(Si$_3$N$_4$):dEu

Chemical Formula 52
(3-a-b-c-d)CaN.aMgN.bSrN.cBaN.3(GaN).(Ge$_3$N$_4$):dEu

Preparation Method of Second Phosphor

The second phosphor is prepared through the following steps.

The preparing process of the second phosphor includes (a) mixing akaline-earth-metal-nitride, akaline-earth-metal-carbonate, nitride having trivalent cation, nitride having tetrad cation, Eu oxide or halogenide, which is an activator, by using acetone, (b) drying the mixture under a temperature of 50° C. to 150° C. for 3 minutes to 24 hours, (c) thermally treating the dried mixture at a hydrogen/nitrogen mixture gas atmosphere having a temperature in the range of 1400° C. to 1700° C. for one hour to 48 hours, (d) obtaining a phosphor particle having a predetermined size by pulverizing or distributing the second phosphor, and (e) washing the phosphor particles by using a solvent to remove a non-reactive material.

Example 1 of Preparation Method of Second Phosphor 1.59 g Sr(NO$_3$)$_2$, 0.10 g Ca$_3$N$_2$, 1.16 g Si$_3$N$_4$, and 0.04 g Eu$_2$O$_3$ were mixed with acetone by using a mortar. The mixture was inserted into a dryer having a temperature of 80° C. and then dried for three hours so that a solvent was volatilized. The dried mixture was placed in an alumina melting pot and then subject to thermal treatment at the temperature 1650° C. for six hours. At this time, the resultant was sintered while applying nitrogen mixture gas containing 25% of hydrogen at a flow rate of 500 cc/min. The phosphor having been subject to the thermal treatment was pulverized, and phosphor having a size available for the light emitting device was distributed in the form of powder having the size of 20 μm, so that nitride-based phosphor having a chemical formula of (2-a-b-c-d)SrN.aMgN.bCaN.cBaN.(Si$_5$N$_8$):dEu (wherein, a=0, b=0.45, c=0, and d=0.05) was prepared.

Example 2 of Preparation Method of Second Phosphor 0.47 g Ca$_3$N$_2$, 0.40 g AlN, 0.46 g Si$_3$N$_4$ and 0.05 g Eu$_2$O$_3$ were mixed with acetone by using a mortar. The mixture was inserted into a dryer having a temperature of 80° C. and then dried for three hours so that a solvent was volatilized. The dried mixture was placed in an alumina melting pot and then subject to thermal treatment at the temperature 1500° C. for six hours. At this time, the resultant was sintered while applying nitrogen mixture gas containing 25% volume of hydrogen at a flow rate of 500 cc/min. The phosphor having been subject to the thermal treatment was pulverized, and phosphor having a size available for the light emitting device was distributed in the form of powder having the size of 20 μm, so that nitride-based phosphor having a chemical formula of (3-a-b-c-d)CaN.aMgN.bSrN.cBaN.3(XN).(Z$_3$N$_4$):dEu (wherein, a=0, b=0, c=0, d=0.03, X=Al, and Z=Si) was prepared.

Light Emitting Characteristic of Second Phosphor

FIG. 16 is a graph showing a light emitting spectrum of a light emitting device including the nitride-based second phosphor.

The nitride-based second phosphor prepared through example 1 of a preparation method of the second phosphor has a characteristic substantially identical to that of the nitride-based second phosphor prepared through example 2 of the preparation method of the second phosphor. In FIG. 16, the light emitting spectrum of the light emitting device including nitride-based phosphor having a chemical formula of (2-a-b-c-d)SrN.aMgN.bCaN.cBaN.(Si$_5$N$_8$):dEu (wherein, a=0, b=0.45, c=0, and d=0.05) is shown.

As shown in FIG. 16, the second phosphor emits the secondary light, which has a peak wavelength in the range of 620 nm to 690 nm, while being excited by blue light having a wavelength of 465 nm, which is emitted from the InGaN-based LED chip 110.

Example of Mixture of Yellow Phosphor of First Phosphor and Second Phosphor

The mixture of the first phosphor and the second phosphor can be obtained by mixing the first phosphor with the second phosphor at the weight ratio in the range of 1:1 to 1:9 or 9:1 to 1:1.

The yellow phosphor having a chemical formula of (4-x-y-z)SrO.xBaO.zCaO.aMgO.2(SiO$_2$).bM$_2$O$_3$:yEu$^2$ (wherein, x=0.65, y=0.05, z=0, a=1, b=0.2, and M=Y, or La), which was prepared through the above preparation method of yellow phosphor of the first phosphor, and the nitride-based phosphor having a chemical formula of (2-a-b-c-d)SrN.aMgN.bCaN.cBaN.(Si$_5$N$_8$):dEu (wherein, a=0, b=0.45, c=0, and d=0.05) were mixed with each other at the weight ratio of 1:1.

Example of Manufacturing Light Emitting Device using Mixture of Yellow Phosphor of First Phosphor and Second Phosphor Referring to FIGS. 1 and 2, the phosphor 151 obtained by mixing the above yellow phosphor of the first phosphor with the second phosphor at the weight ratio of 1:1 is employed for the InGaN-based LED chip 110 having the light emitting a peak wavelength in the range of 430 nm to 480 nm, thereby manufacturing the light emitting device.

In detail, the phosphor 151 was mixed with the molding member 150 including light permeable epoxy resin, and then the resultant was molded to surround the InGaN-based LED chip 110.

The phosphor 151 emits the secondary light having peak wavelengths in the range of 540 nm to 600 nm and 620 nm to 690 nm while being excited by blue light having a wavelength of 465 nm emitted from the InGaN-based LED chip 110.

In this case, the second phosphor of the phosphor 151 may be excited by the blue light from the InGaN-based LED chip 110 and the secondary light from the yellow phosphor of the first phosphor, to emit light having a wavelength longer than those of both the blue light and the secondary light from the yellow phosphor.

FIG. 17 is a graph showing the measurement result of the light emitting spectrum of the light emitting device manufactured using the mixture of the yellow phosphor of the first phosphor and the second phosphor.

As shown in FIG. 17, the light emitting device of emitting the secondary light having a peak wavelength of 620 nm is disclosed.

Example of Mixture of Green Phosphor of First Phosphor and Second Phosphor

The mixture of the first phosphor and the second phosphor can be obtained by mixing the first phosphor with the second phosphor at the weight ratio in the range of 1:1 to 1:9 or 9:1 to 1:1.

The green phosphor having a chemical formula of (4-x-y-z)SrO.xBaO.zCaO.aMgO.2(SiO$_2$).bM$_2$O$_3$:yEu$^2$ (wherein, x=1.25, y=0.05, z=0, a=0.1, b=0.1, and M=Y), which was prepared through the above preparation method of the green phosphor of the first phosphor, and the nitride-based phosphor having a chemical formula of (2-a-b-c-d)SrN.aMgN.bCaN.cBaN.(Si$_5$N$_8$):dEu (wherein, a=0, b=0.45, c=0, and d=0.05) were mixed with each other at the weight ratio of 8.5:1.5.

Example of Manufacturing Light Emitting Device using Mixture of Green Phosphor of First Phosphor and Second Phosphor Referring to FIGS. 1 and 2, the phosphor 151 obtained by mixing the above green phosphor of the first phosphor with the second phosphor at the weight ratio of 8.5:1.5 is employed for the InGaN-based LED chip 110 having the light emitting a peak wavelength in the range of 430 nm to 480 nm, thereby manufacturing the light emitting device.

In detail, the phosphor 151 was mixed with the molding member 150 including light permeable epoxy resin, and then the resultant was molded to surround the InGaN-based LED chip 110.

The phosphor 151 emits the secondary light having central wavelength bands in the range of 480 nm to 540 nm and 620 nm to 690 nm while being excited by blue light having a wavelength of 460 nm emitted from the InGaN-based LED chip 110.

In this case, the second phosphor of the phosphor 151 may be excited by the blue light from the InGaN-based LED chip 110 and the secondary light from the green phosphor of the first phosphor, to emit light having a wavelength longer than those of both the blue light and the secondary light from the green phosphor.

FIG. 18 is a graph showing the measurement result of the light emitting spectrum of the light emitting device manufactured using the mixture of the green phosphor of the first phosphor and the second phosphor.

As shown in FIG. 18, the light emitting device of emitting the secondary light having peak wavelengths of 530 nm and 640 nm is disclosed.

Example of Mixture of Second Phosphor and Mixture of Green Phosphor and Yellow Phosphor of First Phosphor The mixture of the first phosphor and the second phosphor can be obtained by mixing the first phosphor with the second phosphor at the weight ratio in the range of 1:1 to 1:9 or 9:1 to 1:1.

The yellow phosphor having a chemical formula of $(4-x-y-z)SrO.xBaO.zCaO.aMgO.2(SiO_2).bM_2O_3:yEu^2$ (wherein, $x=0.65$, $y=0.05$, $z=0$, $a=1$, $b=0.2$, and $M=Y$, or La) and the green phosphor having a chemical formula of $(4-x-y-z)SrO.xBaO.zCaO.aMgO.2(SiO_2).bM_2O_3:yEu^2$ (wherein, $x=1.25$, $y=0.05$, $z=0$, $a=0.1$, $b=0.1$, and $M=Y$), which were prepared through the above preparation method of the mixture of the yellow phosphor and the green phosphor of the first phosphor, and the nitride-based phosphor having a chemical formula of $(2-a-b-c-d)SrN.aMgN.bCaN.cBaN.(Si_5N_8):dEu$ (wherein, $a=0$, $b=0.45$, $c=0$, and $d=0.05$) were mixed with each other at the weight ratio of 9:3:1.

Example of Manufacturing Light Emitting Device using Mixture of Yellow Phosphor of First Phosphor, Green Phosphor of First Phosphor, and Second Phosphor Referring to FIGS. 1 and 2, the phosphor 151 obtained by mixing the yellow phosphor of the first phosphor, the green phosphor of the first phosphor, and the second phosphor with each other at the weight ratio of 9:3:1 is employed for the InGaN-based LED chip 110 having the light emitting a peak wavelength in the range of 430 nm to 480 nm, thereby manufacturing the light emitting device.

In detail, the phosphor 151 was mixed with the molding member 150 including light permeable epoxy resin, and then the resultant was molded to surround the InGaN-based LED chip 110.

The phosphor 151 emits the secondary light having peak wavelengths in the range of 540 nm to 600 nm, 480 nm to 540 nm, and 620 nm to 690 nm while being excited by blue light having a wavelength of 460 nm emitted from the InGaN-based LED chip 110.

In this case, the second phosphor of the phosphor 151 may be excited by the blue light emitted from the InGaN-based LED chip 110 and the secondary light emitted from the yellow phosphor and the green phosphor of the first phosphor, to emit light having a wavelength longer than those of both the blue light and the secondary light from the yellow phosphor and the green phosphor of the first phosphor.

FIG. 19 is a graph showing the measurement result of the light emitting spectrum of the light emitting device manufactured using the mixture of the yellow phosphor and the green phosphor of the first phosphor and the second phosphor.

As shown in FIG. 19, the light emitting device of emitting the secondary light having a peak wavelength of 620 nm is disclosed.

Embodiment 4

Sulfide-Based Second Phosphor, Preparation Method of Second Phosphor, and Manufacturing of Light Emitting Device using Mixture of First Phosphor and Second Phosphor First Phosphor The first phosphor and the preparation method of the first phosphor are identical to those of embodiment 1.

Second Phosphor

The second phosphor is sulfide-based phosphor expressed in chemical formula 53 or 54.

Chemical Formula 53

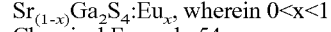
$Sr_{(1-x)}Ga_2S_4:Eu_x$, wherein $0<x<1$

Chemical Formula 54

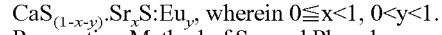
$CaS_{(1-x-y)}.Sr_xS:Eu_y$, wherein $0 \leq x<1$, $0<y<1$.

Preparation Method of Second Phosphor

The second phosphor is prepared through the following steps.

The preparing process of the second phosphor includes (a) mixing akaline-earth-metal-sulfide, sulfide having trivalent cation, nitride having tetrad cation, with Eu oxide or halogenide, which is an activator by using acetone, (b) drying the mixture under a temperature of 50° C. to 150° C. for 3 minutes to 24 hours, (c) thermally treating the dried mixture at a hydrogen/nitrogen mixture gas atmosphere having a temperature in the range of 1000° C. to 1400° C. for one hour to 48 hours, (d) obtaining a phosphor particle having a predetermined size by pulverizing or distributing the second phosphor, and (e) washing the phosphor particles by using a solvent to remove a non-reactive material.

Example 1 of Preparation Method of Second Phosphor 1.01 g SrS, 1.18 g $Ga_2S_3$, 0.23 g S, 0.17 g $Eu_2O_3$ were mixed with acetone by using a mortar. The mixture was inserted into a dryer having a temperature of 100° C. and then dried for three hours so that a solvent was volatilized. The dried mixture was placed in an alumina melting pot and then subject to thermal treatment at the temperature 1100° C. for six hours. At this time, the resultant was sintered while applying nitrogen mixture gas containing 10% volume of hydrogen at a flow rate of 300 cc/min. The second phosphor having been subject to the thermal treatment was pulverized, and phosphor having a size available for the light emitting device was distributed in the form of powder having the size of 20 μm, so that phosphor having a chemical formula of $Sr_{(1-x)}Ga_2S_4:Eu_x$ (wherein, $x=0.1$) was prepared.

Example 2 of Preparation Method of Second Phosphor 2.04 g $CaSO_4$, 0.73 g $SrSO_4$, 0.3 g S, and 0.17 g $Eu_2O_3$ were mixed with acetone by using a mortar. The mixture was inserted into a dryer having a temperature of 100° C. and then dried for three hours so that a solvent was volatilized. The dried mixture was placed in an alumina melting pot and then subject to thermal treatment at the temperature 900° C. for six hours. At this time, the resultant was sintered while applying nitrogen mixture gas containing 10% volume of hydrogen at a flow rate of 300 cc/min. The phosphor having been subject to the thermal treatment was pulverized, and phosphor having a size available for the light emitting device was distributed in the form of powder having the size of 20 μm, so that sulfide-based phosphor having a chemical formula of $CaS_{(1-x-y)}.Sr_xS:Eu_y$ (wherein, x=0.2, y=0.05) was prepared.

Light Emitting Characteristic of Second Phosphor

FIG. 20 is a graph showing a light emitting spectrum of a light emitting device including the sulfide-based second phosphor.

The sulfide-based second phosphor prepared through example 1 of a preparation method of the second phosphor has a characteristic substantially identical to that of the sulfide-based second phosphor prepared through example 2 of the preparation method of the second phosphor. In FIG. 20, the light emitting spectrum of the light emitting device including sulfide-based phosphor having a chemical formula of $Sr_{(1-x)}Ga_2S_4:Eu_x$ (wherein, x=0.1) is shown.

As shown in FIG. 20, the second phosphor emits the secondary light, which has a peak wavelength in the range of 630 nm to 670 nm, while being excited by blue light having a wavelength of 465 nm, which is emitted from the InGaN-based LED chip 110.

Example of Mixture of Yellow Phosphor of First Phosphor and Second Phosphor

The mixture of the first phosphor and the second phosphor can be obtained by mixing the first phosphor with the second phosphor at the weight ratio in the range of 1:1 to 1:9 or 9:1 to 1:1.

The yellow phosphor having a chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y or La), which was prepared through the above preparation method of yellow phosphor of the first phosphor, and the sulfide-based phosphor having a chemical formula of $Sr_{(1-x)}Ga_2S_4:Eu_x$ (wherein, x=0.1), which was prepared through the above preparation method of the second phosphor, were mixed with each other at the weight ratio of 8:2.

Example of Manufacturing Light Emitting Device using Mixture of Yellow Phosphor of First Phosphor and Second Phosphor Referring to FIGS. 1 and 2, the phosphor 151 obtained by mixing the above yellow phosphor of the first phosphor with the second phosphor at the weight ratio of 8:2 is employed for the InGaN-based LED chip 110 having the light emitting a peak wavelength in the range of 430 nm to 480 nm, thereby manufacturing the light emitting device.

In detail, the phosphor 151 was mixed with the molding member 150 including light permeable epoxy resin, and then the resultant was molded to surround the InGaN-based LED chip 110.

The phosphor 151 emits the secondary light having peak wavelengths in the range of 540 nm to 600 nm and 630 nm to 670 nm while being excited by blue light having a wavelength of 460 nm emitted from the InGaN-based LED chip 110.

In this case, the second phosphor of the phosphor 151 may be excited by the blue light from the InGaN-based LED chip 110 and the secondary light from the yellow phosphor of the first phosphor, to emit light having a wavelength longer than those of both the blue light and the secondary light from the yellow phosphor.

FIG. 21 is a graph showing the measurement result of the light emitting spectrum of the light emitting device manufactured using the mixture of the yellow phosphor of the first phosphor and the second phosphor.

As shown in FIG. 21, the light emitting device of emitting the secondary light having a peak wavelength of 610 nm is disclosed.

Example of Mixture of Green Phosphor of First Phosphor and Second Phosphor

The mixture of the first phosphor and the second phosphor can be obtained by mixing the first phosphor with the second phosphor at the weight ratio in the range of 1:1 to 1:9 or 9:1 to 1:1.

The green phosphor having a chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y), which was prepared through the above preparation method of the green phosphor of the first phosphor, and the sulfide-based phosphor having a chemical formula of $Sr_{(1-x)}Ga_2S_4:Eu_x$ (wherein, x=0.1), which was prepared through the above preparation method of the second phosphor, were mixed with each other at the weight ratio of 9:1.

Example of Manufacturing Light Emitting Device using Mixture of Green Phosphor of First Phosphor and Second Phosphor Referring to FIGS. 1 and 2, the phosphor 151 obtained by mixing the above green phosphor of the first phosphor with the second phosphor at the weight ratio of 9:1 is employed for the InGaN-based LED chip 110 having the light emitting a peak wavelength in the range of 430 nm to 480 nm, thereby manufacturing the light emitting device.

In detail, the phosphor 151 was mixed with the molding member 150 including light permeable resin, and then the resultant was molded to surround the InGaN-based LED chip 110.

The phosphor 151 emits the secondary light having peak wavelengths in the range of 480 nm to 540 nm and 630 nm to 670 nm while being excited by blue light having a wavelength of 460 nm emitted from the InGaN-based LED chip 110.

In this case, the second phosphor of the phosphor 151 may be excited by the blue light from the InGaN-based LED chip 110 and the secondary light from the green phosphor of the first phosphor, to emit light having a wavelength longer than those of both the blue light and the secondary light from the green phosphor.

FIG. 22 is a graph showing the measurement result of the light emitting spectrum of the light emitting device manufactured using the mixture of the green phosphor of the first phosphor and the second phosphor.

As shown in FIG. 22, the light emitting device of emitting the secondary light having peak wavelengths of 530 nm and 640 nm is disclosed.

Example of Mixture of Second Phosphor and Mixture of Green Phosphor and Yellow Phosphor of First Phosphor The mixture of the first phosphor and the second phosphor can be obtained by mixing the first phosphor with the second phosphor at the weight ratio in the range of 1:1 to 1:9 or 9:1 to 1:1.

The yellow phosphor having a chemical formula of $(4-x-y-z)SrO.xBaO.zCaO.aMgO.2(SiO_2).bM_2O_3:yEu^2$ (wherein, x=0.65, y=0.05, z=0, a=1, b=0.2, and M=Y, or La) and the green phosphor having a chemical formula of $(4-x-y-z)SrO.xBaO.zCaO.aMgO.2(SiO_2).bM_2O_3:yEu^2$ (wherein, x=1.25, y=0.05, z=0, a=0.1, b=0.1, and M=Y), which were prepared through the above preparation method of the mixture of the yellow phosphor and the green phosphor of the first phosphor, and the sulfide-based phosphor having a chemical formula of $Sr_{(1-x)}Ga_2S_4:Eu_x$ (wherein, x=0.1) were mixed with each other at the weight ratio of 2:7:1.

Example of Manufacturing Light Emitting Device using Mixture of Yellow Phosphor of First Phosphor, Green Phosphor of First Phosphor, and Second Phosphor Referring to FIGS. 1 and 2, the phosphor 151 obtained by mixing the yellow phosphor of the first phosphor, the green phosphor of the first phosphor, and the second phosphor with each other at the weight ratio of 2:7:1 is employed for the InGaN-based LED chip 110 having the light emitting a peak wavelength in the range of 430 nm to 480 nm, thereby manufacturing the light emitting device.

In detail, the phosphor 151 was mixed with the molding member 150 including light permeable epoxy resin, and then the resultant was molded to surround the InGaN-based LED chip 110.

The phosphor 151 emits the secondary light having peak wavelengths in the range of 540 nm to 600 nm, 480 nm to 540 nm, and 630 nm to 670 nm while being excited by blue light having a wavelength of 460 nm emitted from the InGaN-based LED chip 110.

In this case, the second phosphor of the phosphor 151 may be excited by the blue light emitted from the InGaN-based LED chip 110 and the secondary light emitted from the yellow phosphor and the green phosphor of the first phosphor, to emit light having a wavelength longer than those of both the blue light and the secondary light from the yellow phosphor and the green phosphor of the first phosphor.

FIG. 23 is a graph showing the measurement result of the light emitting spectrum of the light emitting device manufactured using the mixture of the yellow phosphor and the green phosphor of the first phosphor and the second phosphor.

As shown in FIG. 23, the light emitting device of emitting the secondary light having peak wavelengths of 545 nm and 645 nm is disclosed.

As described above, new phosphor according to the embodiment of the present invention includes Mg and at least one of Y, Ce, La, Nd, Gd, Tb, Yb, or Lu, so as to provide the optical characteristic superior to that of conventional YAG:$Ce^{3+}$ phosphor generally known to those skilled in the art. In other words, according to embodiment of the present invention, it is possible to obtain phosphor having a superior luminous effect in which a light emitting device can easily express a bluish white color to a reddish white color according to the ratio of added rare earth and alkali components.

In addition, according to embodinment of the present invention, it is possible to control a color coordinate, a color temperature, and a color rendering index while representing high performance as compared with a conventional technology employing the mixture of silicate-based phosphor.

Further, the embodiment of the present invention provides an illumination light source replacing a color LCD backlight of a cellular phone, an LED lamp, a display LED of a train and a bus, or a fluorescence lamp in order to save energy.

INDUSTRIAL APPLICABILITY

Phosphor, phosphor composition, and a light emitting device according to an embodiment of the present invention can express various colors with a high color temperature or a high color rendering index.

The invention claimed is:

1. A silicate-based phosphor expressed in a chemical formula of $(4-x-y-z)SrO.xBaO.zCaO.aMgO.2(SiO_2).bM_2O_3$:yEu, wherein M is at least one of Y, Ce, La, Nd, Gd, Tb, Yb or Lu, in which $0 < x \leq 3.95$, $0 < y \leq 1$, $0 \leq z < 3.95$, $x+y+z<4$, $0 < a < 2$, and $0 < b < 1$.

2. The silicate-based phosphor as claimed in claim 1, wherein, in the chemical formula, x, y and z satisfy $0.01 \leq x < 1.0$, $0.02 \leq y \leq 0.40$, $0 \leq z \leq 1$, and $x+y+z<4$, in which the phosphor is excited by a primary light having a light emitting a peak wavelength in a range of 430 nm to 480 nm so that a secondary light has a light emitting a peak wavelength in a range of 540 nm to 600 nm.

3. The silicate-based phosphor as claimed in claim 1, wherein, in the chemical formula, x, y and z satisfy $1.0 \leq x \leq 3.95$, $0.02 \leq y \leq 0.40$, $z=0$ and $x+y+z<4$, in which the phosphor is excited by a primary light having a light emitting a peak wavelength in a range of 430 nm to 480 nm so that a secondary light has a light emitting peak wavelength in a range of 480 nm to 540 nm.

4. The silicate-based phosphor as claimed in claim 1, wherein, in the chemical formula, x, y and z satisfy $0.01 \leq x < 1$, $0.02 \leq y \leq 0.40$, $1 < z < 3.95$, and $x+y+z<4$, in which the phosphor is excited by a primary light having a light emitting peak wavelength in a range of 430 nm to 480 nm so that a secondary light has a light emitting peak wavelength in a range of 570 nm to 620 nm.

5. The silicate-based phosphor as claimed in claim 1, wherein the silicate-based phosphor is obtained by mixing a phosphor having x, y and z satisfying $0.01 \leq x < 1.0$, $0.02 \leq y \leq 0.40$, $0 \leq z \leq 1$, and $x+y+z<4$ with a phosphor having x, y, and z satisfying $1.0 \leq x \leq 3.95$, $0.02 \leq y \leq 0.40$, $z=0$ and $x+y+z<4$ in the chemical formula.

6. The silicate-based phosphor as claimed in claim 1, wherein the silicate-based phosphor is obtained by mixing a phosphor having x, y and z satisfying $0.01 \leq x < 1.0$, $0.02 \leq y \leq 0.40$, $0 \leq z \leq 1$, and $x+y+z<4$ with a phosphor having x, y, and z satisfying $0.01 \leq x < 1$, $0.02 \leq y \leq 0.40$, $1 < z < 3.95$, and $x+y+z<4$ in the chemical formula.

7. The silicate-based phosphor as claimed in claim 1, wherein the silicate-based phosphor is obtained by mixing a phosphor having x, y and z satisfying $1.0 \leq x \leq 3.95$, $0.02 \leq y \leq 0.40$, $z=0$, and $x+y+z<4$ with a phosphor having x, y, and z satisfying $0.01 \leq x < 1$, $0.02 \leq y \leq 0.40$, $1 < z < 3.95$, and $x+y+z<4$ in the chemical formula.

8. The silicate-based phosphor as claimed in claim 1, wherein the silicate-based phosphor is obtained by mixing a phosphor, which has x, y and z satisfying $0.01 \leq x < 1.0$, $0.02 \leq y \leq 0.40$, $0 \leq z \leq 1$, and $x+y+z<4$, a phosphor, which has x, y, and z satisfying $1.0 \leq x \leq 3.95$, $0.02 \leq y \leq 0.40$, $z=0$, and $x+y+z<4$ and a phosphor, which has x, y, and z satisfying $0.01 \leq x < 1$, $0.02 \leq y \leq 0.40$, $1 < z < 3.95$, and $x+y+z<4$ in the chemical formula.

9. A phosphor obtained by mixing a silicate-based first phosphor, which is expressed in a chemical formula of $(4-x-y-z)SrO.xBaO.zCaO.aMgO.2(SiO_2).bM_2O_3$:yEu (M is at least one of Y, Ce, La, Nd, Gd, Tb, Yb or Lu, $0 < x \leq 3.95$, $0 < y \leq 1$, $0 \leq z < 3.95$, $x+y+z<4$, $0 < a < 2$, and $0 < b < 1$), with a garnet-based phosphor.

10. The phosphor as claimed in claim 9, wherein the garnet-based second phosphor is expressed in a chemical formula of $x(M1_2O_3).y(M2_2O_3)$:zRE, in which M1 is at least one of Y, Tb, La, Yb, Sm, or Lu, M2 is at least one of Al or Ga, RE is at least one of Pr, Gd, or Ce, $0 < x \leq 1.5$, $0 < y \leq 2.5$, and $0 < z \leq 1$.

11. A phosphor obtained by mixing a silicate-based first phosphor, which is expressed in a chemical formula of $(4-x-y-z)SrO.xBaO.zCaO.aMgO.2(SiO_2).bM_2O_3$:yEu (M is at least one of Y, Ce, La, Nd, Gd, Tb, Yb or Lu, $0 < x \leq 3.95$, $0 < y \leq 1$, $0 \leq z < 3.95$, $x+y+z<4$, $0 < a < 2$, and $0 < b < 1$), with a nitride-based phosphor.

12. The phosphor as claimed in claim 11, wherein the nitride-based second phosphor is expressed in a chemical formula of $(2-a-b-c-d)SrN.aMgN.bCaN.cBaN.(Si_5N_8)$:dEu, in which $0 \leq a < 2$, $0 \leq b < 2$, $0 \leq c < 2$, $0 < d \leq 1$, and $a+b+c+d<2$.

13. The phosphor as claimed in claim 11, wherein the nitride-based second phosphor is expressed in a chemical formula of $(3-a-b-c-d)CaN.aMgN.bSrN.cBaN.3(XN).(Z_3N_4)$:dEu, in which X is at least one of Al or Ga, Z is at least one of Si or Ge, $0 \leq a < 3$, $0 \leq b < 3$, $0 \leq c < 3$, $0 < d \leq 1$, and $a+b+c+d<3$.

14. A phosphor obtained by mixing a silicate-based first phosphor, which is expressed in a chemical formula of $(4-x-y-z)SrO.xBaO.zCaO.aMgO.2(SiO_2).bM_2O_3$:yEu (M is at least one of Y, Ce, La, Nd, Gd, Tb, Yb, or Lu, $0 < x \leq 3.95$, $0 < y \leq 1$, $0 \leq z < 3.95$, $x+y+z<4$, $0 < a < 2$, and $0 < b < 1$), with a sulfide-based phosphor.

15. The phosphor as claimed in claim 14, wherein the sulfide-based phosphor is expressed in a chemical formula of $Sr_{(1-x)}Ga_2S_4$:$Eu_x$ ($0 < x < 1$).

16. The phosphor as claimed in claim 14, wherein the sulfide-based phosphor is expressed in a chemical formula of $CaS_{(1-x-y)}.Sr_xS:Eu_y$ ($0 \leq x < 1$ and $0 < y < 1$).

17. A coating phosphor composition comprising transparent resin and a silicate-based phosphor expressed in a chemical formula of $(4-x-y-z)SrO.xBaO.zCaO.aMgO.2(SiO_2).bM_2O_3:yEu$ (M is at least one of Y, Ce, La, Nd, Gd, Tb, Yb, or Lu, $0 < x \leq 3.95$, $0 < y \leq 1$, $0 \leq z < 3.95$, $x+y+z<4$, $0<a<2$, and $0<b<1$).

18. The coating phosphor composition as claimed in claim 17, wherein the phosphor is mixed with the transparent resin at a weight ratio of 1:2 to 1:10.

19. A light emitting device comprising:
a light emitting diode chip that emits light having a light emitting peak wavelength in a range of 430 nm to 480 nm;
a substrate that electrically connects to the light emitting diode chip;
a molding member used to mold the light emitting diode chip; and
a phosphor that is entirely or partially dispersed in the molding member, wherein the phosphor is a silicate-based phosphor expressed in a chemical formula of $(4-x-y-z)SrO.xBaO.zCaO.aMgO.2(SiO_2).bM_2O_3:yEu$ (M is at least one of Y, Ce, La, Nd, Gd, Tb, Yb or Lu, $0 < x \leq 3.95$, $0 < y \leq 1$, $0 \leq z < 3.95$, $x+y+z<4$, $0<a<2$, and $0<b<1$).

20. The light emitting device as claimed in claim 19, wherein the silicate-based phosphor has x, y and z satisfying $0.01 \leq x < 1.0$, $0.02 \leq y \leq 0.40$, $0 \leq z \leq 1$, and $x+y+z<4$, and is excited by a primary light having a light emitting peak wavelength in a range of 430 nm to 480 nm so that a secondary light having a light emitting peak wavelength in a range of 540 nm to 600 nm is emitted.

21. The light emitting device as claimed in claim 19, wherein the silicate-based phosphor has x, y and z satisfying $1.0 \leq x \leq 3.95$, $0.02 \leq y \leq 0.40$, $z=0$, and $x+y+z<4$, and is excited by a primary light having a light emitting peak wavelength in a range of 430 nm to 480 nm so that a secondary light having a light emitting peak wavelength in a range of 480 nm to 540 nm is emitted.

22. The light emitting device as claimed in claim 19, wherein the silicate-based phosphor has x, y and z satisfying $0.01 \leq x < 1$, $0.02 \leq y \leq 0.40$, $1 < z \leq 3.95$, and $x+y+z<4$, and is excited by a primary light having a light emitting peak wavelength in a range of 430 nm to 480 nm so that a secondary light having a light emitting peak wavelength in a range of 570 nm to 620 nm is emitted.

23. A light emitting device comprising:
a light emitting diode chip that emits light having a light emitting peak wavelength in a range of 430 nm to 480 nm;
a substrate that electrically connects to the light emitting diode chip;
a molding member used to mold the light emitting diode chip; and
a phosphor that is entirely or partially dispersed in the molding member, wherein the phosphor includes a silicate-based first phosphor, which is expressed in a chemical formula of $(4-x-y-z)SrO.xBaO.zCaO.aMgO.2(SiO_2).bM_2O_3:yEu$ (M is at least one of Y, Ce, La, Nd, Gd, Tb, Yb or Lu, $0 < x \leq 3.95$, $0 < y \leq 1$, $0 \leq z < 3.95$, $x+y+z<4$, $0<a<2$, and $0<b<1$), and a garnet-based second phosphor.

24. The light emitting device as claimed in claim 23, wherein the garnet-based second phosphor is expressed in a chemical formula of $x(M1_2O_3).y(M2_2O_3):zRE$, in which M1 is at least one of Y, Tb, La, Yb, Sm, or Lu, M2 is at least one of Al or Ga, RE is at least one of Pr, Gd, or Ce, $0<x \leq 1.5$, $0<y \leq 2.5$, and $0<z \leq 1$.

25. A light emitting device comprising:
a light emitting diode chip that emits light having a light emitting peak wavelength in a range of 430 nm to 480 nm;
a substrate that electrically connects to the light emitting diode chip;
a molding member used to mold the light emitting diode chip; and
a phosphor that is entirely or partially dispersed in the molding member, wherein the phosphor comprises a silicate-based first phosphor, which is expressed in a chemical formula of $(4-x-y-z)SrO.xBaO.zCaO.aMgO.2(SiO_2).bM_2O_3:yEu$ (M is at least one of Y, Ce, La, Nd, Gd, Tb, Yb or Lu, $0 < x \leq 3.95$, $0 < y \leq 1$, $0 \leq z < 3.95$, $x+y+z<4$, $0<a<2$, and $0<b<1$), and a nitride-based second phosphor.

26. The light emitting device as claimed in claim 25, wherein the nitride-based second phosphor is expressed in a chemical formula of $(2-a-b-c-d-e)SrN_a.MgN_b.CaN_c.BaN_d.(Si_5N_8):Eu_e$ ($0<a<2$, $0 \leq b<2$, $0 \leq c<2$, $0 \leq d<2$, $0<e \leq 1$, and $a+b+c+d+e<2$).

27. The light emitting device as claimed in claim 25, wherein the nitride-based second phosphor is expressed in a chemical formula of $(3-a-b-c-d-e)CaN_a.MgN_b.SrN_c.BaN_d.3M3N.M4_3N_4:Eu_e$, in which M3 is at least one of Al or Ga, M4 is at least one of Si or Ge, $0<a<3$, $0 \leq b<3$, $0 \leq c<3$, $0 \leq d<3$, $0<e \leq 1$, and $a+b+c+d+e<3$.

28. The light emitting device as claimed in claim 25, wherein the nitride-based second phosphor is excited by light emitted from the light emitting diode chip and light, which is excited in the silicate-based first phosphor, to emit light having a wavelength longer than wavelengths of the light emitted from the light emitting diode chip and the light excited in the silicate-based first phosphor.

29. A light emitting device comprising:
a light emitting diode chip that emits light having a light emitting peak wavelength in a range of 430 nm to 480 nm;
a substrate that electrically connects to the light emitting diode chip;
a molding member used to mold the light emitting diode chip; and
a phosphor that is entirely or partially dispersed in the molding member, wherein the phosphor comprises a silicate-based first phosphor, which is expressed in a chemical formula of $(4-x-y-z)SrO.xBaO.zCaO.aMgO.2(SiO_2).bM_2O_3:yEu$ (M is at least one of Y, Ce, La, Nd, Gd, Tb, Yb or Lu, $0 < x \leq 3.95$, $0 < y \leq 1$, $0 \leq z < 3.95$, $x+y+z<4$, $0<a<2$, and $0<b<1$), and a sulfide-based second phosphor.

30. The light emitting device as claimed in claim 29, wherein the sulfide-based second phosphor is expressed in a chemical formula of $Sr_{(1-x)}Ga_2S_4:Eu_x$ ($0<x<1$).

31. The light emitting device as claimed in claim 29, wherein the sulfide-based second phosphor is expressed in a chemical formula of $CaS_{(1-x-y)}.Sr_xS:Eu_y$ ($0 \leq x<1$ and $0<y<1$).

32. The light emitting device as claimed in claim 29, wherein the sulfide-based second phosphor is excited by light emitted from the light emitting diode chip and light, which is excited in the silicate-based first phosphor, to emit light having a wavelength longer than wavelengths of the light emitted from the light emitting diode chip and the light excited in the silicate-based first phosphor.

* * * * *